United States Patent
Murade

(10) Patent No.: US 6,556,265 B1
(45) Date of Patent: Apr. 29, 2003

(54) LCD HAVING AUXILIARY CAPACITANCE LINES AND LIGHT SHIELDING FILMS ELECTRICALLY CONNECTED VIA CONTACT HOLES

(75) Inventor: Masao Murade, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/423,818

(22) PCT Filed: Mar. 19, 1999

(86) PCT No.: PCT/JP99/01433

§ 371 (c)(1),
(2), (4) Date: Nov. 15, 1999

(87) PCT Pub. No.: WO99/47972

PCT Pub. Date: Sep. 23, 1999

(30) Foreign Application Priority Data

Mar. 19, 1998 (JP) .......................................... 10-071035
Jun. 23, 1998 (JP) .......................................... 10-176244

(51) Int. Cl.[7] .......................................... G02F 1/1333
(52) U.S. Cl. .................... 349/111; 349/110; 349/39; 349/160
(58) Field of Search ............................. 349/38, 39, 110, 349/111, 160

(56) References Cited

U.S. PATENT DOCUMENTS 5,777,701 A * 7/1998 Zhang .......................... 349/44
5,956,103 A * 9/1999 Ishiguro ....................... 349/38
6,297,862 B1 * 10/2001 Murade ........................ 349/44
6,359,665 B1 * 3/2002 Matsushima ................. 349/38

FOREIGN PATENT DOCUMENTS

| JP | A-60-2916 | 1/1985 |
| JP | A-3-52611 | 3/1991 |
| JP | A-3-125123 | 5/1991 |
| JP | A 3-125123 | 5/1991 |
| JP | A-5-257164 | 10/1993 |
| JP | A-8-171101 | 7/1996 |
| JP | A-8-234239 | 9/1996 |
| JP | A 9-12749 | 1/1997 |
| JP | A-9-127497 | 5/1997 |
| JP | A-10-10548 | 1/1998 |

* cited by examiner

Primary Examiner—Toan Ton
Assistant Examiner—Andrew Schechter
(74) Attorney, Agent, or Firm—Oliff & Berridge, PLC

(57) ABSTRACT

With a liquid crystal device of a type wherein light-shielding films are provided below TFTs, in order to enable high-quality image display with a relatively simple configuration using the light-shielding film and capacitance lines, the liquid crystal device may consist of a liquid crystal layer held between a pair of substrates, and pixel electrodes provided in a matrix on a TFT array substrate. A plurality of light-shielding films formed of metal with a high melting point and divided into strips are formed below the pixel TFTs, scanning lines, capacitance lines, and so forth, and the capacitance lines and light-shielding films are electrically connected via contact holes. The resistance of the capacitance lines is lowered by the light-shielding films.

30 Claims, 20 Drawing Sheets

LCD HAVING AUXILIARY CAPACITANCE LINES AND LIGHT SHIELDING FILMS ELECTRICALLY CONNECTED VIA CONTACT HOLES

BACKGROUND OF THE INVENTION

1. Field of the Invention

The present invention belongs to the technical field of a liquid crystal device according to the active-matrix driving method by thin film transistor (hereafter referred to as "TFT" whenever appropriate) driving, and particularly belongs to the technical field of liquid crystal devices of the format wherein a light-shielding film is provided to the lower side of TFTs, and used for liquid crystal projectors and the like.

2. Description of Related Art

Conventionally, in cases wherein such liquid crystal devices are used in liquid crystal projectors and the like as light valves, generally, projected light is cast in from the side of an opposite substrate positioned in a manner opposing a TFT array substrate across a liquid crystal layer. Now, in the event that projected light is cast into a channel area comprised of an a-Si (amorphous silicone) film or a p-Si (poly-silicone) film of a TFT, a photo-current is undesirably generated in this area due to photo-electric conversion effects, and the transistor properties of the TFT deteriorate. Accordingly, generally a light-shielding film formed of a metal material such as Cr (chromium), resin black, or the like is formed at each position facing each TFT on the opposite substrate. The light-shielding films serve to shield light to the opening area (namely, the area transmitting projected light) of each pixel by defining the opening area, and also having the functions of improving contrast, preventing mixing of color materials, and so forth, in addition to shielding light from the p-Si layer of the TFT.

In this type of liquid crystal device, particularly in the event that positive stagger type or coplanar type, a-Si or p-Si TFTs having a top-gate structure (namely, a structure wherein the gate electrode is provided above the channel on the TFT array substrate) are used, there is the need to prevent part of the projected light being cast into the TFT channel from the side of the TFT array substrate as returning light from the projection optical system within the liquid crystal projector. In the same way, there is the need to prevent reflected light from the surface of the TFT array substrate at the time the projected light passes through, or part of projected light cast from other liquid crystal devices passing through the projection optical system in the event that a plurality of liquid crystal devices are combined for color, being cast into the TFT channel from the side of the TFT array substrate as returning light. To this end, Japanese Unexamined Patent Publication No. 9-127497, Japanese Examined Patent Publication No. 3-52611, Japanese Unexamined Patent Publication No. 3-125123, Japanese Unexamined Patent Publication No. 8-171101, and so forth propose a liquid crystal device wherein a light-shielding film is formed of a non-transparent metal with a high melting point at a position facing a TFT on the TFT array substrate formed of a quartz substrate or the like (namely, to the lower side of the TFT).

On the other hand, with such liquid crystal devices, a method is generally used wherein pixel electrodes are provided with a storage capacitor in order to extend the amount of time that voltage is maintained to the pixel electrodes with regard to the time wherein image signals are supplied to the pixel electrodes by setting the TFTs in a conducting state by means of applying scanning signals to the gate electrodes, namely, so that the liquid crystal driving voltage can be applied in a sufficient amount of time even in the event that the duty ratio is small. In such a case, a portion of capacitance lines formed parallel to scanning lines generally comprise other storage capacitor electrodes.

SUMMARY OF THE INVENTION

There is a strong general request for improvement of image quality for liquid crystal devices, and it is important to raise the driving frequencies of liquid crystal devices to this end.

However, in order to provide a storage capacitor to the pixel electrodes as described above, in the event that a high-temperature process including a process wherein the substrate temperature is subjected to a high temperature such as 900 degrees or the like, capacitance lines including the one storage capacitor electrode are formed of a poly-silicone film as with the scanning lines, so lowering resistance is difficult as compared with wirings formed of low-resistance metal film such as Al as data lines, for example. Accordingly, the resistance and time-constant of the capacitance lines increases, and the potential of the capacitance lines fluctuates in the capacitance lines wired in a manner intersecting underneath a plurality of data lines, owing to capacitance coupling with each data line, resulting in a problem that the image quality deteriorates due to sideways cross-talk, ghosting, and the like.

More specifically, as shown in FIG. 20, in the event that an image 801 drawn with a gray background and a highly-contrasted black portion is to be displayed, in the case that image signals of a voltage (here, a voltage corresponding with black) partially differing from the image signal voltage (here, a voltage corresponding with gray) provided to other pixels in a pixel line along a scanning line are provided, writing is performed to each pixel in the pixel line before the potential fluctuation of the capacitance line owing to such capacitance coupling stabilizes. Accordingly, in the actually displayed image 802, there is insufficient voltage at the pixels to the right and left of the pixel to which the image signal of a partially different voltage to be displayed black is provided, resulting in a phenomena wherein the entire line to be displayed as gray turns whitish, namely, sideways cross-talk, ghosting, or the like, is generated.

In this case, particularly, the closer the point wherein image signals of a voltage partially different to be displayed black are provided is to the end of completing writing to each scanning line, namely, the closer the pixel to be displayed black is to the end of a line opposite to the side from which scanning signals are supplied in the event that scanning signals are supplied to one scanning line from the right or the left, or the closer to the center the pixel is in the case that scanning signals are supplied from both ends, the more writing is performed to each pixel in the pixel line before the potential fluctuation of the capacitance line owing to such capacitance coupling stabilizes, so sideways cross-talk, ghosting, or the like, is generated more easily.

Such sideways cross-talk, ghosting, or the like, is generated more easily in the event that the driving frequency increases with liquid crystal devices of types such as so-called XGA, SXGA, and so forth, since the time constant of the capacitance line becomes relatively large. Further, in the event of performing pre-charging wherein pre-charging signals of a certain voltage level are each supplied to data lines before the image signals so that image signal voltage can be written to the data lines with a small load, there is the need to secure a horizontal retrace line period of a certain length for pre-charging, so time for the potential fluctuation of the capacitance line owing to capacitance coupling to stabilize cannot be sufficiently secured following providing the image signal with a partially different voltage at a point close to the point of completing writing in each scanning line. Accordingly, there is a problem in that it is difficult to present the above-described sideways cross-talk, ghosting, or the like, when performing pre-charging.

In order to solve the problem of such sideways cross-talk, ghosting, or the like, the data line inversion driving method wherein the polarity of driving voltage applied to the liquid crystal is inverted for each data line (1S inversion driving method) and the dot inversion driving method wherein each dot is inverted are effective, but these methods generate intense generation of disclination (defective alignment) of the liquid crystal following the data lines and scanning lines, causing display deterioration, so these methods are not practical under the basic requests of increasing the rate of opening of the pixel area, in particular.

The present invention has been made in light of the above-described problems, and it is an object thereof to provide a liquid crystal device capable of high-quality image display by means of a relatively simple configuration using a storage capacitor and a light-shielding film.

In order to solve the above problems, a first liquid crystal device according to the present invention may consist of: a plurality of pixel electrodes arrayed in a matrix on one substrate of a pair of substrates between which a liquid crystal is held; a plurality of thin film transistors, each of which drives the plurality of pixel electrodes; a plurality of data lines and plurality of scanning lines, each connected to the plurality of thin film transistors and intersecting with each other; a plurality of capacitance lines arrayed along with the plurality of scanning lines and each extending in a direction intersecting with the plurality of data lines, wherein each provides a storage capacitor to the plurality of pixel electrodes; a plurality of light-shielding films, each extending in a direction intersecting with the plurality of data lines, and provided at positions so as to cover at least the channel area of the plurality of thin film transistors when viewed from the side of the one substrate, and at positions each at least partially facing the plurality of capacitance lines, wherein each is electrically connected with the plurality of capacitance lines for every pixel or plurality of pixels in a direction intersecting with the plurality of data lines; and a first inter-layer insulating film existing between the plurality of light-shielding films and the thin-film transistors.

According to the first liquid crystal device according to the present invention, a plurality of capacitance lines, each of which provides a storage capacitor to a plurality of pixel electrodes, are arrayed along with the plurality of scanning lines and each extending in a direction intersecting with the plurality of data lines (namely, parallel with or generally parallel with the respective scanning lines). On the other hand, a plurality of light-shielding films, each extends in a direction intersecting with the plurality of data lines (namely, parallel with or generally parallel with the respective scanning lines), are provided on one substrate at positions so as to cover at least the channel area of the plurality of thin film transistors when viewed from the side of the one substrate. Accordingly, the channel area of the thin film transistors is shielded from light by multiple light-shielding films regarding returning light cast in from the side of the one substrate, thereby preventing deterioration of the properties of the thin film transistors due to returning light and the like.

The plurality of light-shielding films is provided on one substrate at positions where each at least partially facing the plurality of capacitance lines, and each is electrically connected with the plurality of capacitance lines for every pixel or plurality of pixels in a direction intersecting with the plurality of data lines. Accordingly, the resistance of the capacitance line can be markedly lowered by the resistance of the plurality of light-shielding films. For example, by forming the capacitance lines from a poly-silicone film and forming the plurality of light-shielding films from a conductive metal film with a high melting point, the resistance of the capacitance lines in the direction parallel to the scanning lines can be governed by the resistance of the plurality of light-shielding films. That is, great reduction of resistance in the capacitance lines can be made.

Consequently, a storage capacitor is provided to each of the plurality of pixel electrodes by the low-resistance capacitance lines, so even in the event that the driving frequency of the liquid crystal device is increased, sideways cross-talk, ghosting, or the like, due to potential fluctuation of the capacitance line owing to capacitance coupling between the data lines and capacitance lines as in the conventional example described above is reduced, and high-quality image display can be performed. Also, even in the event that the above-described pre-charging method is used, the problems such as with the conventional example do not occur.

Further, the plurality of light-shielding films extend in a direction intersecting with the data lines, which may consist of a plurality of strips of light-shielding film divided in a direction parallel to the data lines so that stress generated during the heating/cooling in the manufacturing process due to differences in the material properties of the films can be markedly relieved in the layered structure formed of the light-shielding film wiring, an inter-layer insulating film, a poly-silicone film, a metal film, and the like, as compared with a case wherein an integrally-formed grid-like, light-shielding film wiring is provided around the opening area for each pixel, for example. Accordingly, cracking of the light-shielding film can be prevented and yield can be improved.

In addition, a redundant structure can be realized, wherein even in the event that a capacitance line is broken due to a foreign object or the like, a plurality of light-shielding films serve in the place of the capacitance line.

With one form of the first liquid crystal device according to the present invention, the above-described light-shielding films are not formed at positions facing the scanning lines, except for positions covering the channel area.

According to this form, capacitance coupling between each of the light-shielding films and each of the scanning lines either hardly occurs for all practical purposes or does no occur at all, so there is no occurrence of potential fluctuation in the light-shielding film owing to change in potential in the scanning lines, and consequently there is no occurrence of potential fluctuation in the capacitance lines.

In order to solve the above problems, a second liquid crystal device according to the present invention may consist of: a plurality of pixel electrodes arrayed in a matrix on one substrate of a pair of substrates between which a liquid crystal is held; a plurality of thin film transistors, each of which drives the plurality of pixel electrodes; a plurality of data lines and plurality of scanning lines mutually intersecting and each connected to the plurality of thin film transistors; a plurality of capacitance lines arrayed along with the plurality of scanning lines and each extending in a direction intersecting with the plurality of data lines, wherein each provides a storage capacitor to the plurality of pixel electrodes; a plurality of light-shielding films, each extending in a direction intersecting with the plurality of data lines, provided at positions so as to cover at least the channel area of the plurality of thin film transistors when viewed from the side of the one substrate and at positions where each at least partially facing the plurality of scanning lines, wherein each is electrically connected with the plurality of capacitance lines for every pixel or plurality of pixels in a direction intersecting with the plurality of data lines; and a first inter-layer insulating film existing between the plurality of light-shielding films and the thin-film transistors.

According to the second liquid crystal device according to the present invention, as with the above-described first liquid crystal device according to the present invention, a plurality of capacitance lines, each of which provides a storage capacitor to a plurality of pixel electrodes, are arrayed along with the plurality of scanning lines and each extending in a direction intersecting with the plurality of data lines. On the other hand, a plurality of light-shielding films, each extends in a direction intersecting with the plurality of data lines, are provided on one substrate at positions so as to cover at least the channel area of the plurality of thin film transistors when viewed from the side of the one substrate. The plurality of light-shielding films are electrically connected to the plurality of capacitance lines for every pixel or plurality of pixels in a direction intersecting with the plurality of data lines. Accordingly, the same operations and advantages as those of the above-described first liquid crystal device according to the present invention can be obtained.

Particularly, with the second liquid crystal device, the light-shielding film is provided on the one substrate at positions at least partially facing the scanning lines. That is, the scanning lines are formed on the light-shielding film at this position, with a first inter-layer insulating film much thicker than the gate insulating film which may consist of the thin-film transistors, for example, introduced therebetween. Accordingly, even in the event that an unintended abnormal formation such as a protrusion or the like happens to be formed on the light-shielding film during the manufacturing process, the probability of this protrusion or the like perforating the first inter-layer insulating film and thereby short-circuiting the scanning lines is vastly reduced. Particularly, in cases wherein a semiconductor layer, a gate insulating film, and capacitance lines are further layered and formed upon such a protrusion formed on the light-shielding film, the configuration according to the second liquid crystal device of the present invention wherein the light-shielding film is formed at positions opposing the scanning lines is more advantageous in terms of improved yield as compared to the above-described first liquid crystal device according to the present invention, when the increase in the probability of this protrusion or the like perforating extremely thin gate insulating film through the semiconductor layer and thereby short-circuiting the semiconductor layer and the capacitance lines is taken into consideration.

According to another form of the first liquid crystal device according to the present invention or to the second liquid crystal device, the capacitance lines and the scanning lines are formed of the same conductive thin film, and the capacitance lines serving as a first storage capacitor electrode and second storage capacitor electrode extending from a semiconductor layer comprising a source or drain area on the side of the thin film transistor connected to the pixel electrode are provided with the storage capacitor by means of being opposingly positioned with a dielectric film which is formed of an insulating film which is the same as the gate insulating film of the thin film transistor being introduced therebetween.

According to this form, the capacitance lines and the scanning lines are formed of the same conductive thin film such as a poly-silicone film, the dielectric film of the storage capacitor and the gate insulating film of the thin film transistor are of the same insulating thin film such as a high-temperature thermal-oxidized film, and the storage capacitor electrodes facing the capacitance lines are formed of a semiconductor layer such as poly-silicone film, so the layered structure formed on the one substrate can be simplified, and further both of the capacitance lines and scanning lines can be formed in the same thin film forming process, or the dielectric film and gate insulating film can both be formed at the same time, which is greatly advantageous from a manufacturing perspective.

With this form, the plurality of light-shielding films may be opposingly positioned as a third storage capacitor electrode at the opposite side of the second storage capacitor electrode with the first storage capacitor electrode and the first inter-layer insulating film introduced therebetween, thereby further providing the storage capacitor.

According to such a configuration, a structure wherein a storage capacitor is provided to both sides across from the first storage capacitor electrode, namely, a double storage capacitor structure is built, so the storage capacitance increases, and functions of preventing flickering and burning of the display image improve.

According to another form of the first or second liquid crystal devices of the present invention, the first inter-layer insulating film is introduced between the capacitance lines and the plurality of light-shielding films, with the plurality of capacitance lines and the plurality of light-shielding films being each electrically connected via contact holes opened in the first inter-layer insulating film for each pixel or plurality of pixels.

According to this form, the plurality of capacitance lines and the plurality of light-shielding films are each electrically connected via contact holes opened in the first inter-layer insulating film for each pixel or plurality of pixels, so a highly reliable electrical connection state can be realized between the two in a sure manner.

The form of the opened contact holes may be such that the contact holes are opened at positions below the data lines when viewed from the side of the other substrate of the pair of substrates.

According to such a configuration, the contact holes are opened at positions below the data lines, namely, the contact holes are away from the pixel portion opening areas, and further, the contact holes are provided to the first inter-layer insulating film portion at which the thin film transistor or the one electrode of the storage capacitor extended from semiconductor layer of the thin film transistor are not formed, and thus effective use of the pixel area can be made.

In the forms of the opened contact holes, the contact holes may have a circular form such as a true circle or an ellipse for the planar form thereof, parallel to the one substrate.

According to such a configuration, in the event that a wet etching process is used as the manufacturing process for opening the contact holes, the probability of the etching solution seeping in at the surface between the plurality of light-shielding films and the neighboring films (namely, the first inter-layer insulating film and the like) so as to cause cracking to be reduced. That is, in the event that one attempts to open contact holes of a square planar form or the like, the solution particularly easily seeps in at the corner portions and also stress tends to be concentrated at such portions, and thus cracking easily occurs at such corners.

In the forms of the opened contact holes, further, each of the plurality of light-insulating films may have a planar form parallel to the one substrate which includes a first area formed parallel to the scanning lines and a second area extended from the first area parallel to the data lines, with the contact holes being opened in the second area.

According to such a configuration, stress placed on the light-shielding film during the manufacturing process can be relieved according to how close the contact holes are opened to the tip of the second area, thereby enabling the prevention of cracking in a more effective manner, and improving yield.

According to another form of the first or second liquid crystal device of the present invention, the capacitance lines and the plurality of light-shielding films are connected to a constant potential source.

According to this form, the plurality of light-shielding films are connected to a constant potential source, so the light-shielding films have a constant potential. Accordingly, change in the potential of the light-shielding film wiring having undesirable effects on the thin film transistors positioned facing the light-shielding films can be prevented. Also, the capacitance lines also have a constant potential, and thus can function as storage capacitor electrodes in a satisfactory manner. In this case, the constant potential of the constant potential source may be equal to the ground potential, for example.

In this form, the configuration may be such that the constant potential source is a constant potential source supplied to peripheral circuit for driving the liquid crystal device.

According to this configuration, the constant potential source is a constant potential source such as a negative power source or positive power source supplied to peripheral circuit such as the scanning line driving circuit or data line driving circuit, and thus there is no need to provide special potential wiring or external circuit connection terminals, and the light-shielding films and capacitance lines can be easily be made to have a constant potential.

Or, the configuration may be such that an opposite electrode is formed on the other substrate of the pair of substrates, such that the constant potential source is a constant potential source supplied to the opposite electrode.

According to this configuration, the constant potential source is a constant potential source such as a negative power source or positive power source supplied to the opposite electrode, and thus there is no need to provide special potential wiring or external circuit connection terminals, and the light-shielding films and capacitance lines can be easily be made to have a constant potential.

According to another form of the first or second liquid crystal device of the present invention, each of the plurality of light-shielding films are each electrically connected to the capacitance lines for forming a storage capacitor given to pixels of neighboring tiers, either the preceding tier or the following tier.

According to this configuration, the offset at the area along the edge of the opening area of the pixel where the pixel TFTs, capacitance lines, and light-shielding films are formed over the data lines can be made smaller with regard to other areas, as compared with cases wherein each of the plurality of light-shielding films are each electrically connected to their own capacitance lines, namely, electrically connected to capacitance lines for providing a storage capacitor to pixel electrodes connected to TFTs with the channel area thereof positioned over the light-shielding films. Now, the term neighboring capacitance line, or capacitance line of previous or following tier refers to a capacitance line for providing a storage capacitor to a pixel electrode neighboring a capacitance line for forming a storage capacitor to be provided to pixel electrodes connected to TFTs with the channel area thereof positioned over the light-shielding films. In the case that the offset is small, as in this case, liquid crystal disclination (defective alignment) of the liquid crystal caused by the offset can be reduced.

According to another form of the first or second liquid crystal device of the present invention, each of the plurality of light-shielding films are each electrically connected to the capacitance lines of its own tier.

According to this configuration, the offset where the pixel TFTs, capacitance lines, and light-shielding films are formed over the data lines increases, but the capacitance lines and light-shielding films can be electrically connected relatively easily, by contact holes and the like.

This form may be configured so as to further comprise a second inter-layer insulating film provided above the scanning lines and below the data lines, and a third inter-layer insulating film provided above the data lines and below the pixel electrodes, wherein the side of the third inter-layer insulating film which faces the liquid crystal is flattened by means of at least one of the first, second, and third inter-layer insulating films being recessed at least portions facing the data lines.

According to this configuration, at least one of the first, second, and third inter-layer insulating films are recessed at least portions facing the data lines, and thus the offset where the pixel TFTs, capacitance lines, and light-shielding films are formed over the data lines can be reduced with regard to other areas. The side of the third inter-layer insulating film which faces the liquid crystal is thus flattened, so disclination (defective alignment) of the liquid crystal caused by unevenness on the surface of the third inter-layer insulating film can be reduced according to the degree of this flattening.

With another form of the first or second liquid crystal device according to the present invention, the plurality of light-shielding films include at least one-of the following: Ti (titanium), Cr (chromium), W (tungsten), Ta (tantalum), Mo (molybdenum), and Pb (lead).

According to this form, the light-shielding films are formed of a single metal, alloy, metal silicide, or the like, including at least one of the following non-transparent metals with high melting points: Ti, Cr, W. Ta, Mo, and Pb. Accordingly, the light-shielding films are formed so as to not be damaged or melt during the high-temperature processing in the TFT formation process performed following the process of forming the light-shielding films on the TFT array substrate.

The present invention is a projection-type display apparatus which has a light source, a liquid crystal light valve for performing modulation to incident light cast from the light source according to image information, and projecting element for projecting the light modulated by the liquid crystal light valve; wherein the liquid crystal light valve has a liquid crystal device in which a liquid crystal is held between a first substrate positioned at the light incident side and a second substrate positioned at the light outgoing side, a first polarizing element positioned at the outward side of the first substrate, and a second polarizing element positioned at the outward side of the second substrate; and wherein the following are provided upon the second substrate: a plurality of pixel electrodes arrayed in a matrix on the second substrate; a plurality of thin film transistors, each of which drives the plurality of pixel electrodes; a plurality of data lines and plurality of scanning lines mutually intersecting and each connected to the plurality of thin film transistors; a plurality of capacitance lines arrayed along with the plurality of scanning lines and each extending in a direction intersecting with the plurality of data lines, wherein each provide a storage capacitor to the plurality of pixel electrodes; a plurality of light-shielding films, each extending in a direction intersecting with the plurality of data lines, and provided at positions so as to cover at least the channel area of the plurality of thin film transistors when viewed from the side of the one substrate and at positions each at least partially facing the plurality of capacitance lines, wherein each is electrically connected with the plurality of capacitance lines for every pixel or plurality of pixels in a direction intersecting with the plurality of data lines; and a first inter-layer insulating film existing between the plurality of light-shielding films and the thin-film transistors.

According to this form, leak current owing to returning light can be prevented by forming a light-shielding film between the second substrate and thin-film transistor. Also, since effects of the returning light to the liquid crystal device can be prevented, there is no need to apply a polarizing element with a reflection-preventing film onto the liquid crystal device as with conventional arrangements, and clearance formation can be realized, so temperature increase in the liquid crystal device can be prevented.

In order to solve the above problems, a third liquid crystal device according to the present invention may consist of: a plurality of pixel electrodes arrayed in a matrix on one substrate of a pair of substrates between which a liquid crystal is held; a plurality of thin film transistors, each of which drives the plurality of pixel electrodes; a plurality of data lines and plurality of scanning lines mutually intersecting and each connected to the plurality of thin film transistors; a plurality of capacitance lines formed along with the plurality of scanning lines, each for providing a storage capacitor to the plurality of pixel electrodes; conductive light-shielding films provided at positions so as to cover at least the channel area of the plurality of thin film transistors when viewed from the side of the one substrate, wherein each includes a wiring portion extended along with the scanning lines and is electrically connected to the plurality of capacitance lines; and a first inter-layer insulating film existing between the light-shielding films and the thin-film transistors.

According to the liquid crystal device of the present invention, light-shielding films are provided at positions so as to cover at least the channel area of the plurality of thin film transistors when viewed from the side of the one substrate. Accordingly, the channel area of the thin film transistors is shielded from light by light-shielding films regarding returning light cast in from the side of the one substrate, thereby preventing deterioration of the properties of the thin film transistors due to returning light and the like. On the other hand, the capacitance lines are formed parallel to a plurality of scanning lines, with these capacitance lines and the conductive light-shielding films including the wiring portions extended parallel to the scanning lines being electrically connected. Accordingly, the resistance of the capacitance line can be markedly lowered by the resistance of the conductive light-shielding films. For example, by forming the capacitance lines from a poly-silicone film and forming the plurality of light-shielding films from a conductive metal film with a high melting point, the resistance of the capacitance lines in the direction parallel to the scanning lines can be governed by the sheet resistance of the plurality of light-shielding films. That is, the resistance of at the capacitance lines can be greatly reduced.

Consequently, a storage capacitor is provided to each of the plurality of pixel electrodes by the low-resistance capacitance lines, so even in the event that the driving frequency of the liquid crystal device is increased, sideways cross-talk, ghosting, or the like, due to potential fluctuation of the capacitance line owing to capacitance coupling between the data lines and capacitance lines as described above is reduced, and high-quality image display can be performed.

In addition, a redundant structure can be realized, wherein even in the event that a capacitance line is broken due to a foreign object or the like, a plurality of light-shielding films serve in the place of the capacitance line.

With a form of the third liquid crystal device according to the present invention, the capacitance lines and the scanning lines are formed of the same conductive thin film, and the capacitance lines serving as one storage capacitor electrode and the other storage capacitor electrode extending from a semiconductor layer which may consist of a source or drain area of the side of the thin film transistor connected to the pixel electrode may consist of a storage capacitor by means of being opposingly positioned with a dielectric film which is formed of an insulating film which is the same as the gate insulating film of the thin film transistor being introduced therebetween.

According to this form, the capacitance lines and the scanning lines are formed of the same conductive thin film such as a poly-silicone film or the like, the dielectric film of the storage capacitor and the gate insulating film of the thin film transistor are of the same insulating thin film such as a high-temperature thermal-oxidized film or the like, and the storage capacitor electrodes facing the capacitance lines are formed of a semiconductor layer portion such as poly-silicone film or the like, so the layered structure formed on the one substrate can be simplified, and further, both the capacitance lines and scanning lines can be formed in the same thin film forming process, or the dielectric film and gate insulating film can both be formed at the same time, which is greatly advantageous from a manufacturing perspective.

With another form of the third liquid crystal device according to the present invention, the first inter-layer insulating film is introduced between the capacitance lines and the light-shielding films, and the capacitance lines and the light-shielding films are each connected via contact holes opened in the first inter-layer insulating film.

According to this form, the capacitance lines and the light-shielding films are each connected via contact holes opened in the first inter-layer insulating film, so a highly reliable electrical connection state can be realized between the two in a sure manner.

With another form of the third liquid crystal device according to the present invention, the contact holes are opened for each pixel.

According to this form, the capacitance lines and the light-shielding films are each connected via contact holes opened for each pixel, so lowering of the resistance of the capacitance lines by the light-shielding film can be promoted, and further, the degree of redundancy in structure between the two can be increased.

With another form of the third liquid crystal device according to the present invention, the contact holes are opened for each pixel group formed of a plurality of pixels.

According to this form, the capacitance lines and the light-shielding films are each connected via contact holes opened for each pixel group formed of a plurality of pixels, so the advantages of lowering the resistance of the capacitance lines by the light-shielding film, and of the redundant structure can be appropriately balanced with the complexity in the manufacturing process or with problems such as defective liquid crystal devices, while giving consideration to the sheet resistance of the capacitance lines and light-shielding film, the driving frequency and required specifications and the like thereof, and thus is extremely advantageous in practical implementations.

With another form of the third liquid crystal device according to the present invention, the contact holes are opened below the data lines when viewed from the side of the other substrate of the pair of substrates.

According to this form, the contact holes are opened below the data lines. That is, the contact holes are away from the pixel portion opening areas, and further, the contact holes are provided to the first inter-layer insulating film portion at which the thin film transistor or the one electrode of the storage capacitor extended from semiconductor layer of the thin film transistor are not formed, so effective use of the pixel area can be made.

With another form of the third liquid crystal device according to the present invention, the capacitance lines and the light-shielding films are connected to a constant potential source.

According to this form, the light-shielding films are connected to a constant potential source, so the light-shielding films have a constant potential. Accordingly, change in the potential of the light-shielding films having undesirable effects on the thin film transistors positioned facing the light-shielding films can be prevented. Also, the capacitance lines also have a constant potential, and thus can function as storage capacitor electrodes in a satisfactory manner. In this case, the constant potential of the constant potential source may be equal to the ground potential, for example.

With another form of the third liquid crystal device according to the present invention, the constant potential source is a constant potential source supplied to peripheral circuit for driving the liquid crystal device.

According to this form, the constant potential source is a constant potential source such as a negative power source or positive power source supplied to peripheral circuit such as the scanning line driving circuit, data line driving circuit, or sampling circuit, so the light-shielding films and capacitance lines can be made to have constant potentials without providing special potential wiring or external circuit connection terminals.

With another form of the third liquid crystal device according to the present invention, an opposite electrode is formed on the other substrate of the pair of substrates, and the constant potential source is a constant potential source supplied to the opposite electrode.

According to this form, the constant potential source is a constant potential source such as a negative power source or positive power source supplied to the opposite electrode, thus the light-shielding films and capacitance lines can be made to have a constant potential without providing special potential wiring or external circuit connection terminals.

With another form of the third liquid crystal device according to the present invention, the capacitance lines include wiring portions each formed parallel to the plurality of scanning lines, and the light-shielding films include wiring portions formed parallel to the scanning lines so as to each appear overlapped when the capacitance line portion is viewed from the side of the one substrate.

According to this form, the wiring portions of the capacitance lines, each being formed parallel to the plurality of scanning lines:, and the wiring portions of the light-shielding films formed parallel to the scanning lines are mutually electrically connected, the resistance of the capacitance lines can be reduced in the direction parallel to the scanning lines, and also the degree of redundancy of the above-described redundant structure of the capacitance lines can particularly be increased in the direction parallel to the scanning lines.

With another form of the third liquid crystal device according to the present invention, the light-shielding films are provided in a screen-like manner at positions so as to each appear overlapped with at least one of the plurality of scanning lines and the plurality of capacitance lines, and the plurality of data lines when viewed from the side of the one substrate.

According to this form, the light-shielding films are provided in a screen-like manner, so-lowering of the resistance of the electrically-connected capacitance lines by the light-shielding film can be promoted, and further, the degree of redundancy in structure between the two can be increased.

With another form of the third liquid crystal device according to the present invention, the light-shielding films are provided in strips at positions so as to each appear overlapped with at least one of the plurality of scanning lines and the plurality of capacitance lines when viewed from the side of the one substrate.

According to this form, the light-shielding films are provided in strips, so lowering of the resistance of the electrically-connected capacitance lines by the light-shielding film, especially in a direction along with the scanning line, can be promoted, and further, the degree of redundancy in structure between the two can be increased.

With another form of the third liquid crystal device according to the present invention, the light-shielding films are provided in an island-like manner at positions so as to each appear overlapped with at least one of the plurality of scanning lines and the plurality of capacitance lines when viewed from the side of the one substrate, and each of the plurality of the island-shaped portions arrayed parallel to the scanning lines are mutually electrically connected via the capacitance lines.

According to this form, the light-shielding films are provided in an island-like manner, and the plurality of the island-shaped portions arrayed parallel to the scanning lines are mutually electrically connected via the capacitance lines, thus lowering of the resistance of the electrically-connected capacitance lines by the light-shielding film can be promoted, and further, the degree of redundancy in structure between the two can be increased.

With another form of the third liquid crystal device according to the present invention, the light-shielding films are provided in strips parallel to the data lines.

According to this form, formation can be made without lowering the opening ratio, by means of extending along the data lines. Further, in the event that the light-shielding films are formed parallel to the scanning lines or capacitance lines for example, a contact hole is often formed nearby which brings a pixel electrode and the semiconductor layer into contact. At this time, there is the danger of the stress of the light-shielding film suppressed by the inter-layer insulating film being discharged by the opening of the contact hole between the pixel electrode and the semiconductor layer near the light-shielding film, and it causes cracking in the light-shielding films. However, in the event that the light-shielding films are formed parallel to the data lines, the light-shielding films can be removed from the contact hole between the pixel electrode and the semiconductor layer, so the effects of stress of the light-shielding film can be relieved as much as possible. Also, connecting the light-shielding films parallel to the data lines to the capacitance lines enables reduction in resistance of the capacitance lines.

With another form of the third liquid crystal device according to the present invention, the light-shielding films are connected to a constant potential source.

According to this form, change in the potential of the light-shielding films having undesirable effects on the thin film transistors positioned facing the light-shielding films can be prevented.

With another form of the third liquid crystal device according to the present invention, the light-shielding films include at least one of the following: Ti, Cr, W, Ta, Mo, and Pb.

According to this form, the light-shielding films are formed of a single metal, alloy, metal silicide, or the like, including at least one of the following non-transparent metals with high melting points: Ti, Cr, W, Ta, Mo, and Pb. Accordingly, the light-shielding films are formed so as to not be damaged or melt during the high-temperature processing in the TFT formation process performed following the process of forming the light-shielding films on the TFT array substrate.

Another form of the third liquid crystal device according to the present invention may further consist of a second inter-layer insulating film provided above the scanning lines and below the data lines, and a third inter-layer insulating film provided above the data lines and below the pixel electrodes; wherein the side of the third inter-layer insulating film which faces the liquid crystal is flattened by means of at least one of the first, second, and third inter-layer insulating films being recessed at portions facing at least one of the thin film transistors, the data lines, the scanning lines, and the capacitance lines.

With another form of the third liquid crystal device according to the present invention, the side of the third inter-layer insulating film which faces the liquid crystal is flattened by means of at least one of the first, second, and third inter-layer insulating films being recessed, thus disclination (defective alignment) of the liquid crystal caused by unevenness on the surface of the third inter-layer insulating film can be reduced according to the degree of this flattening.

The present invention is electronic equipment comprising the third liquid crystal device.

According to this form, the electronic equipment has the liquid crystal device according to the invention of the present application, so image display with high quality can be realized with a liquid crystal device which has high reliability due to the redundant structure, reduced display deterioration such as sideways cross-talk, and superb light-shielding capabilities regarding returning light and the like.

Such operations and other advantages of the present invention will become clear from the embodiments described next.

DETAILED DESCRIPTION OF PREFERRED EMBODIMENTS

The embodiments of the present intention will be described below with reference to the drawings.
(Configuration and Operation of the First Embodiment of the Liquid Crystal Device)

Figure 1:
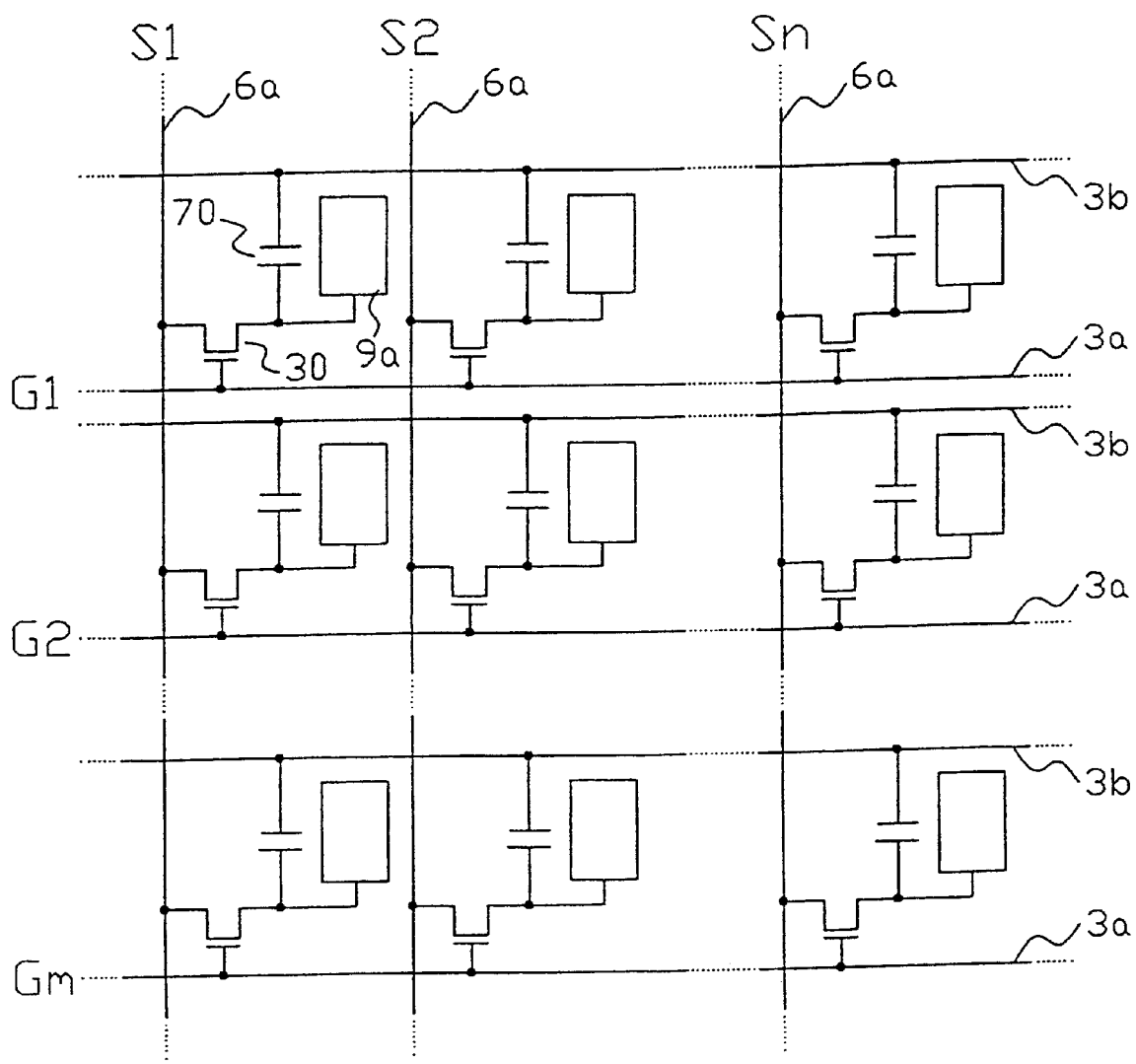
FIG. 1 is an equivalent circuit of the various elements, wiring, or the like, provided to the matrix-shaped plurality of pixels which may consist of the image display area according to the first embodiment of the liquid crystal device.
Figure 2:
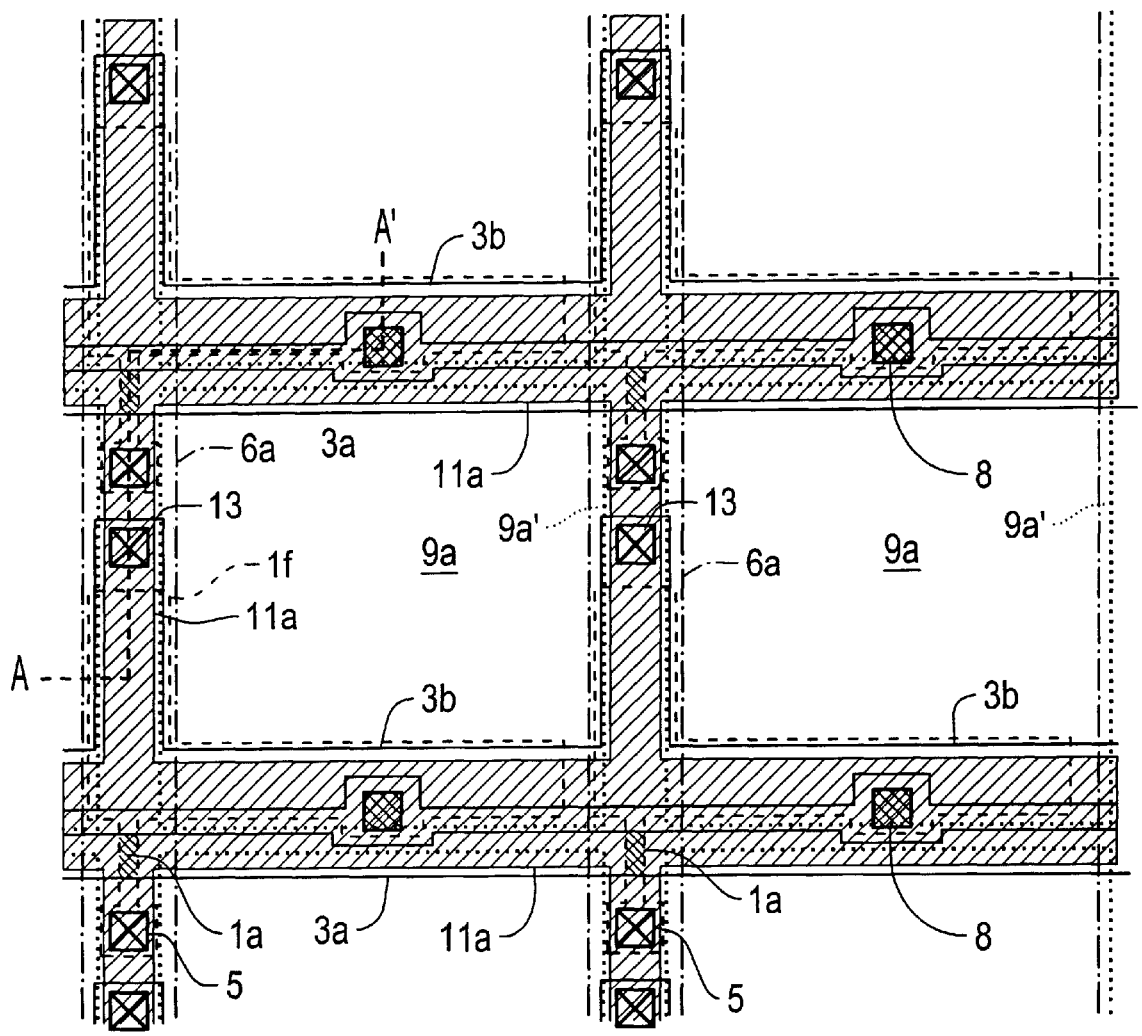
FIG. 2 is a plan view of a plurality of pixel groups neighboring on a TFT array substrate upon which are formed data lines, scanning lines, pixel electrodes, light-shielding films, or the like, according to the first embodiment of the liquid crystal device.
Figure 3:
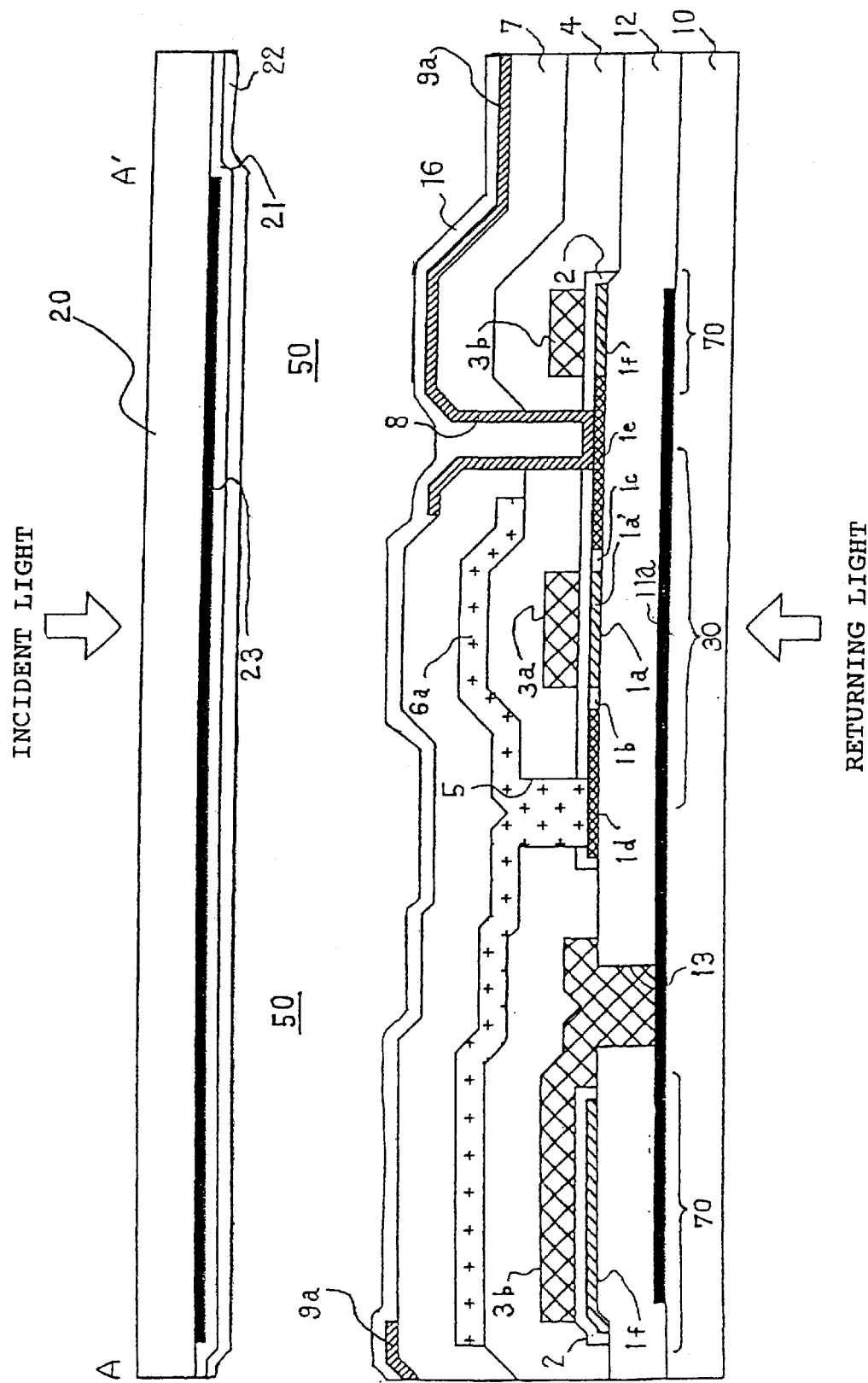
FIG. 3 is a cross-sectional diagram along A–A' in FIG. 2.
Figure 4:
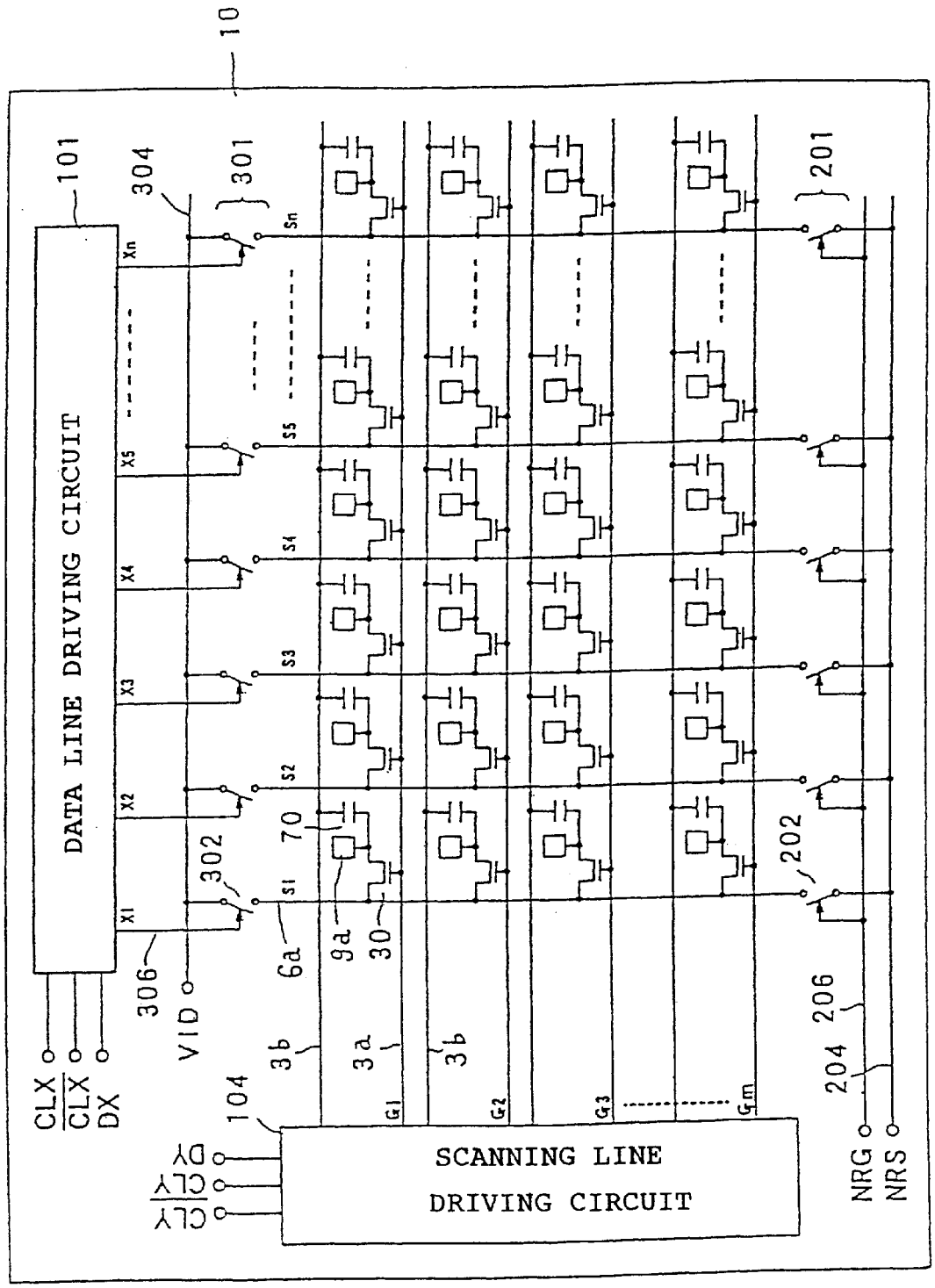
FIG. 4 is a block diagram of the pixel portion and peripheral circuit provided on the TFT array substrate according to the first embodiment of the liquid crystal device.
Figure 5:
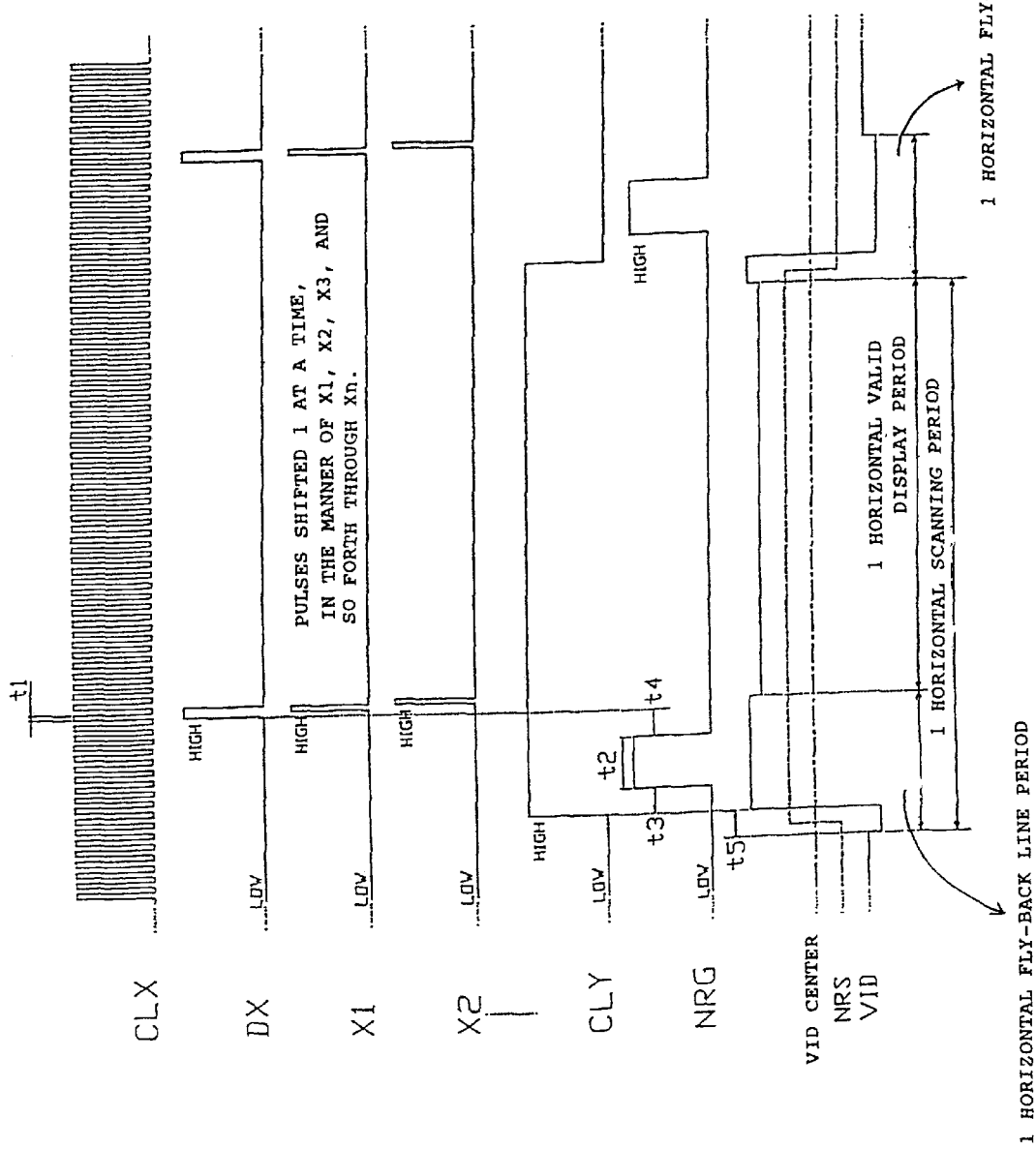
FIG. 5 is a timing chart for various signals regarding pre-charging.

The configuration and operation of the first embodiment of the liquid crystal device according to the present invention will be made with reference to FIG. 1 through FIG. 5. FIG. 1 is an equivalent circuit of the various elements, wiring, or the like, provided to the matrix-shaped plurality of pixels which may consist of the image display area of the liquid crystal device. FIG. 2 is a plan view of a plurality of pixel groups neighboring on a TFT array substrate upon which are formed data lines, scanning lines, pixel electrodes, light-shielding films, or the like, of the liquid crystal device, and FIG. 3 is a cross-sectional diagram along A–A' in FIG. 2. FIG. 4 is a plan view showing the two-dimensional wiring layout of the light-shielding films on the TFT array substrate along with the peripheral circuit, and FIG. 5 is a timing chart for various signals regarding pre-charging. Incidentally, in FIG. 3, the reduction scale is changed for each layer and member, so the layers and members can be of a recognizable size in a drawing.

In FIG. 1, the plurality of pixels formed in a matrix which may consist of the image display area of the liquid crystal device according to the present embodiment have a plurality of pixel electrodes 9a and TFTs 30 for controlling the pixel electrodes 9a formed in a matrix, and data lines 6a for supplying image signals are electrically connected to the source areas of the TFTs 30. The image signals S1, S2, . . . , Sn to be written to the data lines 6a may be supplied in that order, or may be supplied to each group of multiple neighboring data lines 6a. Also, scanning lines 3a are electrically connected to the gates of the TFTs 30, and are configured to apply scanning signals G1, G2, . . . , Gm in a pulse form in this order, in line sequence. The pixel electrodes 9a are electrically connected to the drains of the TFTs 30, and the image signals S1, S2, . . . , Sn supplied from the data lines 6a are written at a certain timing, by closing the switch of the TFT 30 which is a switching element, for only a certain period. The predetermined level image signals S1, S2, . . . , Sn written to the liquid crystal via the pixel electrodes 9a are held between the opposite electrode (later described) formed on the opposite substrate (later described) for a certain period or time. Now, in order to prevent the held image signals from leaking, a storage capacitor 70 is provided parallel with the liquid crystal capacitance formed between the pixel electrode 9a and the opposite electrode. For example, the voltage of the pixel electrode 9a is stored in the storage capacitor 70 by an amount of time 3 digits longer than the time that the source voltage was applied. Accordingly, the holding properties are further improved, and a liquid crystal device with a high contrast ratio can be realized. Incidentally, regarding methods for forming the storage capacitor 70, a capacitance line 3b which is a line for forming capacitance may be provided, or capacitance may be formed between the scanning line 3a of the previous tier, of course.

In FIG. 2, a plurality of transparent pixel electrodes 9a are provided in a matrix on the TFT array substrate of the liquid crystal device (outline shown by the dotted line portion 9a'), and a data line 6a, a scanning line 3a and a capacitance line 3b are each provided parallel to the vertical and horizontal boundaries of the pixel electrode 9a. The data line 6a is electrically connected to the later-described source area of the semiconductor layer 1a formed of poly-silicone film, via a contact hole 5, and the pixel electrode 9a is electrically connected to the later-described drain area of the semiconductor layer 1a, via a contact hole 8. Also, a scanning line 3a is positioned so as to oppose the later-described channel area in the semiconductor layer 1a (the area hatched in the Figure from the upper left to the lower right). Then, a first light-shielding film 11a is provided at the pixel position in the area shown as hatched in the Figure from the lower left to the upper right. That is, the first light-shielding film 11a is provided at a position in the pixel portion where the TFT including the channel area of the semiconductor layer 1a, data line 6a, scanning line 3a, and capacitance line 3b each appear overlaid when viewed from the side of the TFT array substrate.

As shown in FIG. 3, the liquid crystal device has a TFT array substrate 10 which may consist of an example of one transparent substrate, and an opposite substrate 20 comprising an example of another transparent substrate positioned in an opposing manner. The TFT array substrate 10 is formed of a quartz substrate or silicone substrate, for example, and the opposite substrate 20 is formed of a glass substrate or a quartz substrate, for example. Pixel electrodes 9a are provided to the TFT array substrate 10, and provided thereupon is an alignment film 16 which has been subjected to a certain alignment processing such as rubbing processing or the like. The pixel electrodes 9a are formed of a transparent conductive thin film such as an ITO (Indium Tin Oxide) film. Also, the alignment film 16 is formed of an organic thin film such as a polyimide thin film.

On the other hand, an opposite electrode (common electrode) 21 is provided over then entire surface of the opposite substrate 20, under which is provided is an alignment film 22 which has been subjected to a certain alignment processing such as rubbing processing. The opposite electrode 21 is formed of a transparent conductive thin film such as an ITO film. Also, the alignment film 22 is formed of an organic thin film such as a polyimide thin film.

As shown in FIG. 3, pixel switching TFTs 30 for performing switching control of each of the pixel electrodes 9a are provided on the TFT array substrate 10 at positions neighboring each of the pixel electrodes 9a.

As further shown in FIG. 3, a second light-shielding film 23 is provided to the opposite substrate 20 to areas other than each of the pixel opening areas. Consequently, incident light from the side of the opposite substrate 20 never intrudes into the channel area 1a' of the semiconductor layer 1a of the pixel switching TFT 30 or the low-concentration source area 1b and low-concentration drain area 1c. Further, the second light-shielding film 23 has functions for improving contrast and preventing mixing of color materials.

A liquid crystal is sealed between the TFT array substrate 10 and opposite substrate 20 configured as described above and positioned so that the pixel electrodes 9a and opposite electrode 21 face one another, in a space defined by a later-described sealing material 52 (see FIG. 18 and FIG. 19), thereby forming a liquid crystal layer 50. The liquid crystal layer 50 assumes a certain alignment in a state wherein an electric field is not applied from the pixel electrodes 9a, owing to the orienting films.

As shown in FIG. 3, first light-shielding films 11a are each provided in a screen-like manner parallel to the pixels between the TFT array substrate 10 and each pixel switching TFT 30, at positions each opposing the pixel switching TFTs 30. The first light-shielding films 11a are formed of a single metal, alloy, metal silicide, or the like, including at least one of the following non-transparent metals with high melting points: Ti, Cr, W, Ta, Mo, and Pb. As a result of using such materials, the light-shielding films 11a can be prevented from being damaged or melting during the high-temperature processing in the formation process of the pixel switching TFT 30 performed following the process of forming the light-shielding films 11a on the TFT array substrate 10. As a result of the light-shielding films 11a being disposed thus, returning light from the side of the TFT array substrate 10 can be prevented from entering into the channel area 1a' of the pixel switching TFT 30 or the low-concentration source area 1b and low-concentration drain area 1c, so the properties of the pixel switching TFT 30 do not deteriorate from generation of a photo-electric current.

Further, a first inter-layer insulating film 12 is provided between the first light-shielding film 11a and the pixel switching TFT 30. The first inter-layer insulating film 12 is provided for electrically insulating the semiconductor layer 1a which may consist of the pixel switching TFT 30 from the first light-shielding film 11a. Further, the first inter-layer insulating film 12 is provided over the entire surface of the TFT array substrate 10, and thus also serves as a base film for the pixel switching TFT 30. That is to say, this has functions of preventing deterioration of the properties of the pixel switching TFT 30 owing to coarseness on the surface of the TFT array substrate 10 due to polishing or soiling that remains after cleansing. The first inter-layer insulating film 12 also prevents the first light-shielding film 11a from contaminating the pixel switching TFT 30 beforehand.

In the present embodiment, an insulating thin film 2 serving as a gate insulating film is extended from the position opposing the gate electrode formed from a part of the scanning line 3a, and is used as a dielectric film; the semiconductor layer 1a is extended and used as a first storage capacitor electrode 1f; and a portion of the capacitance line 3b opposing these is used as a second storage capacitor electrode; thus forming a storage capacitor 70. More specifically, the high-concentration drain area 1e of the semiconductor layer 1a is extended below the data line 6a and scanning line 3a, and is positioned in a manner opposing the capacitance line 3b extending along the same data line 6a and scanning line 3a, across the insulating thin film 2, thereby forming the first storage capacitor electrode 1f. Particularly, in the event that the insulating thin film 2 serving as the dielectric member of the storage capacitor 70 is the gate insulating film of the TFT 30 formed on a poly-silicone film by means of high-temperature oxidation, an insulating film which is thin and has great pressure-resistance can be formed, thus the storage capacitor 70 can be configured as a storage capacitor having a great capacitance with a relatively small area.

As a result of the above, the storage capacitance of the pixel electrode 9a can be increased, by utilizing the area under the data line 6a and the area parallel to the scanning line 3a (namely, the area in which the capacitance line 3b is formed), which is space away from the opening area.

With the present embodiment, particularly, the capacitance line 3b and the first light-shielding film 11a are electrically connected by a contact hole 13. Accordingly, the resistance of the capacitance line 3b can be markedly lowered by the resistance of the first light-shielding film 11a.

With the present embodiment, the capacitance line 3b is formed of a poly-silicone film with a sheet resistance value of around 25Ω, so in the event of a small liquid crystal device with a diagonal span of around 1.3 inches or 0.9 inches, the resistance is around 100 to 200 KΩ, but the first light-shielding film 11a is formed of a conductive metal film with a high melting point, so the resistance of the capacitance lines 3b in the direction parallel to the scanning lines 3a is greatly lowered in resistance.

Figure 20:
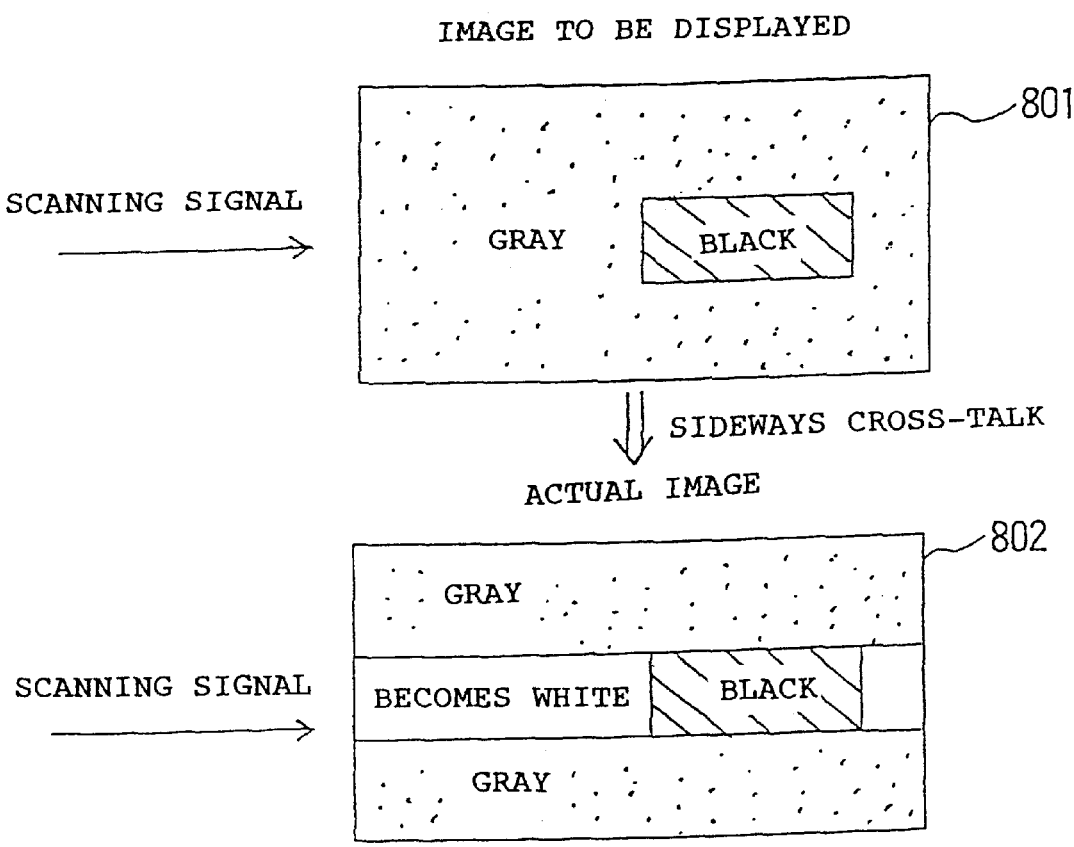
FIG. 20 is a conceptual diagram for describing display deterioration owing to sideways cross-talk.

Consequently, regarding the time-constant of the capacitance line 3b as well, this can be reduced from around ten-something $\mu$ seconds to around several $\mu$ seconds for example, due to the existence of the first light-shielding film 11a. Accordingly, sideways cross-talk, ghosting, or the like, due to potential fluctuation of the capacitance line 3b owing to capacitance coupling between the capacitance line 3b wired so as to intersect below the data line 6a with the data line 6a can be reduced. That is, as shown in FIG. 20, in the case of displaying an image 801 which has been drawn with a black portion drawn with high contrast on a gray background, problems of display deterioration such as that shown in image 802 do not occur, even in the event that the point in time at which the image signal of partially differing voltage to be displayed as black is close to the point of completing writing at each scanning line. Particularly, even in the event that this liquid crystal device is configured as a type with high driving frequency, such as XGA, SXGA, the time-constant of the capacitance line 3b is sufficiently small, so occurrence of sideways cross-talk, ghosting, or the like, can be reduced in this case as well.

Accordingly, there is no need to employ methods wherein the polarity of the liquid crystal driving voltage is inverted for each data line 6a or each pixel as described above in order to prevent sideways cross-talk, ghosting, or the like; rather, the scanning line inversion driving method (the so-called 1H inversion driving method) wherein the liquid crystal driving voltage is inverted for each scanning line 3a, which is capable of reducing disclination of the liquid crystal layer 50 and is suitable for increasing the pixel opening ratio, can be used.

With the present embodiment, further, the first light-shielding film 11a (and the capacitance line 3b electrically connected thereto) is electrically connected to a constant potential source, so the first light-shielding film 11a and the capacitance line 3b have a constant potential. Accordingly, change in the potential of the first light-shielding film 11a having undesirable effects on the pixel switching TFT 30 positioned facing the first light-shielding film 11a can be prevented. Furthermore, the capacitance line 3b can function satisfactorily as the second storage capacitor electrode of the storage capacitor 70. In this case, examples of the constant potential source include a constant potential source such as a negative power source or positive power source supplied to peripheral circuit for driving the liquid crystal device (for example, scanning line driving circuit, data line driving circuit, sampling circuit), and a constant potential source or the like supplied to a ground power source and opposite electrode 21. Using the power source for peripheral circuit and the like in such a manner does away with the need to provide dedicated potential wiring and external circuit connecting terminals, and the first light-shielding film 11a and the capacitance line 3b can have a constant potential.

In FIG. 3, the pixel switching TFT 30 has the structure of an LDD (Lightly Doped Drain), and has a scanning line 3a, a channel area 1a' of the semiconductor layer 1a where a channel is formed by an electrical field from the scanning line 3a, an insulating thin film 2 insulating the scanning line 3a and the semiconductor layer 1a, a data line 6a, a low-concentration source area 1b and a low-concentration drain area 1c of the semiconductor layer 1a, and a high-concentration source area 1d and a high-concentration drain area 1e of the semiconductor layer 1a. In the present embodiment, the data line 6a may consist of a light-shielding thin film such as a metal film such as Al or an alloy film such as metal silicide. Also, a second inter-layer insulating film 4 is formed on the scanning line 3a, the insulating thin film 2 and first inter-layer insulating film 12, with a contact hole 5 leading to the high-concentration source area 1d and a contact hole 8 leading to the high-concentration drain area 1e each formed therein. The data line 6a is connected to the high-concentration source area 1d via the contact hole 5. Further, a third inter-layer insulating film 7 is formed on the data line 6a and the second inter-layer insulating film 4. The high-concentration drain area 1e is electrically connected to the pixel electrode 9a via the contact hole 8. Incidentally, the pixel electrode 9a and the high-concentration drain area 1emay be electrically connected by being relayed through an Al film which is the same as the data line 6a or a poly-silicone film which is the same as the scanning line 3b.

The pixel switching TFT 30 preferably has an LDD structure such as that described above, but this may be an offset structure wherein there is no injection of impurity ions to the low-concentration source area 1b and the low-concentration drain area 1c, or may be a self-aligning TFT wherein impurity ions are injected at a high concentration with the gate electrode serving as a mask, thereby forming high-concentration source and drain areas in a self-aligning manner.

Also, with the present embodiment, a single-gate structure is used wherein a single gate electrode comprised of a portion of the scanning line 3a of the pixel switching TFT 30 is positioned between the source/drain area, but two or more gate electrodes may be provided therebetween. In such a case, the configuration is such that the same signals are applied to each gate electrode. Configuring the TFT with a dual gate (double-gate) or triple gate or higher facilitates prevention of leakage current at the contact portion between the channel and source/drain, and the current can be reduced when off. Off-current can be further reduced, by configuring at least one of these gate electrodes as an LDD structure or offset structure, and a stable switching element can thus be obtained.

Now, generally, the poly-silicone film which forms the a channel area 1a' of the semiconductor layer 1a, and the low-concentration source area 1b and the low-concentration drain area 1c, is such that incident light causes generation of photo-electric current due to the photo-electricity converting effects of the poly-silicone, resulting in the transistor properties of the pixel switching TFT 30 deteriorating, but with the present embodiment, the data line 6a is formed of a light-shielding metal thin film such as Al so as to overlay the scanning line 3a from above, so incident light (namely, the light from above in FIG. 3) being cast onto at least the channel area 1a' of the semiconductor layer 1a, and the low-concentration source area 1b and the low-concentration drain area 1c, can be effectively prevented. Also, as described above, the first light-shielding film 11a is provided below the pixel switching TFT 30, so returning light (namely, the light from below in FIG. 3) being cast onto at least the channel area 1a' of the semiconductor layer 1a, and the low-concentration source area 1b and the low-concentration drain area 1c, can be effectively prevented.

Next, the configuration of the peripheral circuit provided on the TFT array substrate 10 in the present embodiment will be described with reference to FIG. 4.

In FIG. 4, the liquid crystal device comprises as a peripheral circuit: a data line driving circuit 101 for driving the data lines 6a, a scanning line driving circuit 104 for driving the scanning lines 3a, pre-charging circuits 201 for supplying the plurality of data lines 6a with pre-charging signals (NRS) of a certain voltage level before they are supplied with image signals S1, S2, . . . , Sn, and sampling circuits 301 which sample the image signals S1, S2, . . . , Sn supplied to the image signal lines and supply each to the plurality of data lines 6a.

The scanning line driving circuit 104 applies scanning signals G1, G2, . . . , Gm as pulses in line sequence to the scanning lines 3a at a certain timing, based on a power source supplied from the external control circuit, a reference clock CLY and the inverted clock thereof, and so forth.

The data line driving circuit 101 supplies transfer signals X1, X2, . . . , Xn from the shift register as sampling circuit driving signals for each data line 6a to the sampling circuit 301 via the sampling circuit driving signal lines 306 at a certain timing, in conjunction with the timing that the scanning line driving circuit 104 applies scanning signals G1, G2, . . . , Gm, based on the power source supplied from the external control circuit, the reference clock CLY and the inverted clock thereof, and so forth.

The pre-charging circuit 201 has a TFT 202, for example, as a switching element for each data line 6a, the pre-charge signal line 204 is connected to the drain or source of the TFT 202, and the pre-charging circuit driving signal lines 206 are connected to the gate electrodes of the TFT 202. Then, when operating, a power source of a certain voltage required to write pre-charging signals (NRS) is supplied from the external power source via the pre-charging signal lines 204, and pre-charging circuit driving signals (NRG) are supplied from the external control circuit via the pre-charging circuit driving signal lines 206 so as to write pre-charging signals (NRS) at a timing preceding the image signals S1, S2, . . . , Sn being supplied, to each data line 6a. Preferably, the pre-charging circuits 201 supply pre-charging signals (NRS) equivalent to intermediate gradient level image signals S1, S2, . . . , Sn (image supplementing signals).

The sampling circuit 301 has a TFT 302 for each data line 6a, the image signal line 304 is connected to the drain or source electrode of the TFTs 302, and the sampling circuit driving signal lines 306 are connected to the gate electrodes of the TFTs 302. Then, once the image signals S1, S2, . . . , Sn are input via the image signal line 304, these are sampled. That is, once the transfer signals X1, X2, . . . , Xn serving as sampling circuit driving signals are input from the data line driving circuit 101 via the sampling circuit driving signal lines 306, the image signals S1, S2, . . . , Sn from the image signal line 304 are sequentially applied to the data lines 6a.

In this way, with the present embodiment, the data lines 6a are selected one at a time, but the configuration may be such that several data lines 6a are selected collectively at the same time. For example, a configuration may be used wherein serial/parallel-converted image signals S1, S2, . . . , Sn are supplied from image signal lines 304 to multiple phases (for example, 3-phase, 6-phase, 12-phase, . . . ), according to the writing characteristics of the TFT 302 comprising the sampling circuit 301 and the frequency of the image signals, and these are simultaneously sampled by group. It is needless to say that in this case, the number of image signal lines 304 needed is at least the number of serial/parallel conversions.

Now, the pre-charging performed by the liquid crystal device according to the present embodiment will be described with reference to FIG. 5.

As shown in FIG. 5, a clock signal (CLX) stipulating the selection time t1 of each pixel is input to a shift register of the data line driving circuit 101 as a horizontal scanning reference, and once a transfer starting signal (DX) is input, transfer signals X1, X2, . . . are sequentially output form this shift register. In each horizontal scanning period, pre-charging circuit driving signals (NRG) are supplied to the pre-charging circuit 201 at a timing preceding the input of such a transfer starting signal (DX). More specifically, the clock signal (CLY) which is the vertical scanning reference is at a high level, and also the image signal (VID) is polarity-inverted with the voltage center value (VID center) as a reference, following which the pre-charging circuit driving signal (NRG) is set to a high level after the time t3, which is the margin from polarity inversion to pre-charging, elapses. On the other hand, the pre-charging signals (NRS) is set at a certain level of the same polarity as the image signals (VID) in the horizontal retrace period, in accordance with the inversion of the image signals (VID). Accordingly, pre-charging is performed during the time t2 wherein the pre-charging circuit driving signal (NRG) is set to a high level. Then, the pre-charging circuit driving signal (NRG) is set to a low level at a time t4 before the horizontal retrace period ends and the valid display period begins, namely, with time t4 as a margin between the ending of pre-charging and the writing of the image signals. As described above, the pre-charging circuit 201 supplies pre-charging signals (NRS) to a plurality of data lines prior to the image signals, during the horizontal retrace period.

In FIG. 5, pre-charging is performed during the horizontal retrace period, but the fluctuation of the potential of the capacitance lines 3b owing to the aforementioned capacitance coupling of the data lines 6a and the capacitance lines 3b heads toward being stabilized within the time t5. Accordingly, it might be thought that setting the timing of the respective signals such that the time t5 is extended would prevent such fluctuation of the potential of the capacitance lines 3b. However, in the event that the time t5 is extended, the times t3, t2, and t4 must be shortened. Now, in the event that the time t3 is shortened too much, there is the danger that the gate of the TFT 30 relating to the scanning line of the previous tier might turn on at the point that the pre-charging circuit driving signal (NRG) is at a high level, owing to gate delay of the TFT comprising the pre-charging circuit or the like. Also, shortening the time t2 results in the pre-charging capabilities being lowered or requiring a pre-charging circuit with high charge supplying capabilities. Also, in the event that the time t4 is shortened, the pre-charging signal and the image signal might be applied to the data line 6a at the same time. Accordingly, in order to perform pre-charging in a suitable manner, the time t5 for stabilizing the fluctuation of the potential of the capacitance lines 3b owing to capacitance coupling cannot be simply extended. Nevertheless, according to the present invention, the resistance of the capacitance lines 3b is greatly reduced by the first light-shielding film 11a, and the time-constant is greatly lowered, so the time t5 can be extended relative to the time constant of the capacitance line 3b.

In the event that such pre-charging is performed as well, the present embodiment is capable of maintaining a horizontal retrace period sufficiently long for pre-charging, and also securing an essentially sufficient time t5 for stabilizing the fluctuation of the potential of the capacitance lines 3b owing to capacitance coupling.

As a result of the above, according to the present embodiment, even in the event that the driving frequency is high, pre-charging and the aforementioned scanning line inversion driving can be performed suitably, and also sideways cross-talk, ghosting, or the like, owing to capacitance coupling can be prevented, so image display of extremely high quality can be realized.

In addition, according to the present embodiment, a redundant structure is realized, wherein even in the event that a capacitance line 3b is partly broken due to a foreign object or the like, the first light-shielding film 11a serves as the capacitance line 3b. That is, even in the event that a capacitance line 3b is partly broken, there is no practical problem as long as both ends of the broken portion are electrically connected by the first light-shielding film 11a via the contact hole 13. Accordingly, according to the present embodiment, a liquid crystal device with a low detect rate, high reliability, and capable of displaying images with high quality can be realized.

Also, the capacitance lines 3b and scanning lines 3a are formed of the same poly-silicone film, the dielectric film of the storage capacitor 70 and the insulating thin film 2 comprising the gate insulating film of the TFT 30 both include the same high-temperature oxidized film, and the first storage capacitor electrode 1f, the channel area 1a' of the TFT 30, the high-concentration source area 1d, and the high-concentration drain area 1e, are formed of the same semiconductor layer 1a. Accordingly, the layered structure formed on the TFT array substrate 10 can be simplified, and further, in the later-described manufacturing method for the liquid crystal device, the capacitance lines 3b and scanning lines 3a can be formed at the same time with the same thin film forming process, and the dielectric film of the storage capacitor 70 and the insulating thin film 2 can be formed at the same time.

With the present embodiment, particularly, the capacitance lines 3b and the first light-shielding film 11a are both electrically connected in a sure manner with high reliability via the contact hole 13 opened in the first inter-layer insulating film 12, but such contact holes 13 may be provided for each pixel, or may be opened for each pixel group comprised of a plurality of pixels.

In the event that the contact hole 13 is provided for each pixel, lowering of resistance of the capacitance line 3b by the first light-shielding film 11a can be promoted, and further, the degree of the redundancy in structure between the two can be increased. On the other hand, in the event that the contact hole 13 is provided for each pixel group which may consist of a plurality of pixels (for example, every two pixels or every three pixels), the advantages of lowering the resistance of the capacitance lines 3b by the light-shielding films 11a, and of the redundant structure can be appropriately balanced with the complexity in the manufacturing process of opening a great number of contact holes 13 or with problems such as defective liquid crystal devices, while giving consideration to the sheet resistance of the capacitance lines 3b and the light-shielding films 11a, the driving frequencies and required specifications and the like thereof, and thus is extremely advantageous in practical implementations.

Also, particularly with the present embodiment, the contact holes 13 provided for each pixel or for each pixel group which may consist of a plurality of pixels are opened below the data lines 6a when viewed form the side of the opposite substrate 20. Accordingly, the contact holes 13 are away from the pixel opening areas, and are provided on the first inter-layer insulating film 12 where the TFTs 30 and first storage capacitor electrodes 1f are not formed, thus defects in the TFTs 30 and other wiring and the like owing to forming the contact holes 13 can be prevented while making effecting use of the pixel area.

(Manufacturing Process of the First Embodiment of the Liquid Crystal Device)

Next, the process of manufacturing the first embodiment of the liquid crystal device having a structure such as described above, will be described with reference to FIG. 6 through FIG. 9. Incidentally, FIG. 6 through FIG. 9 are process diagrams illustrating each layer on the side of the TFT array substrate in each process in a manner corresponding with the A–A' cross-section in FIG. 2, as with FIG. 3.

Figure 6:
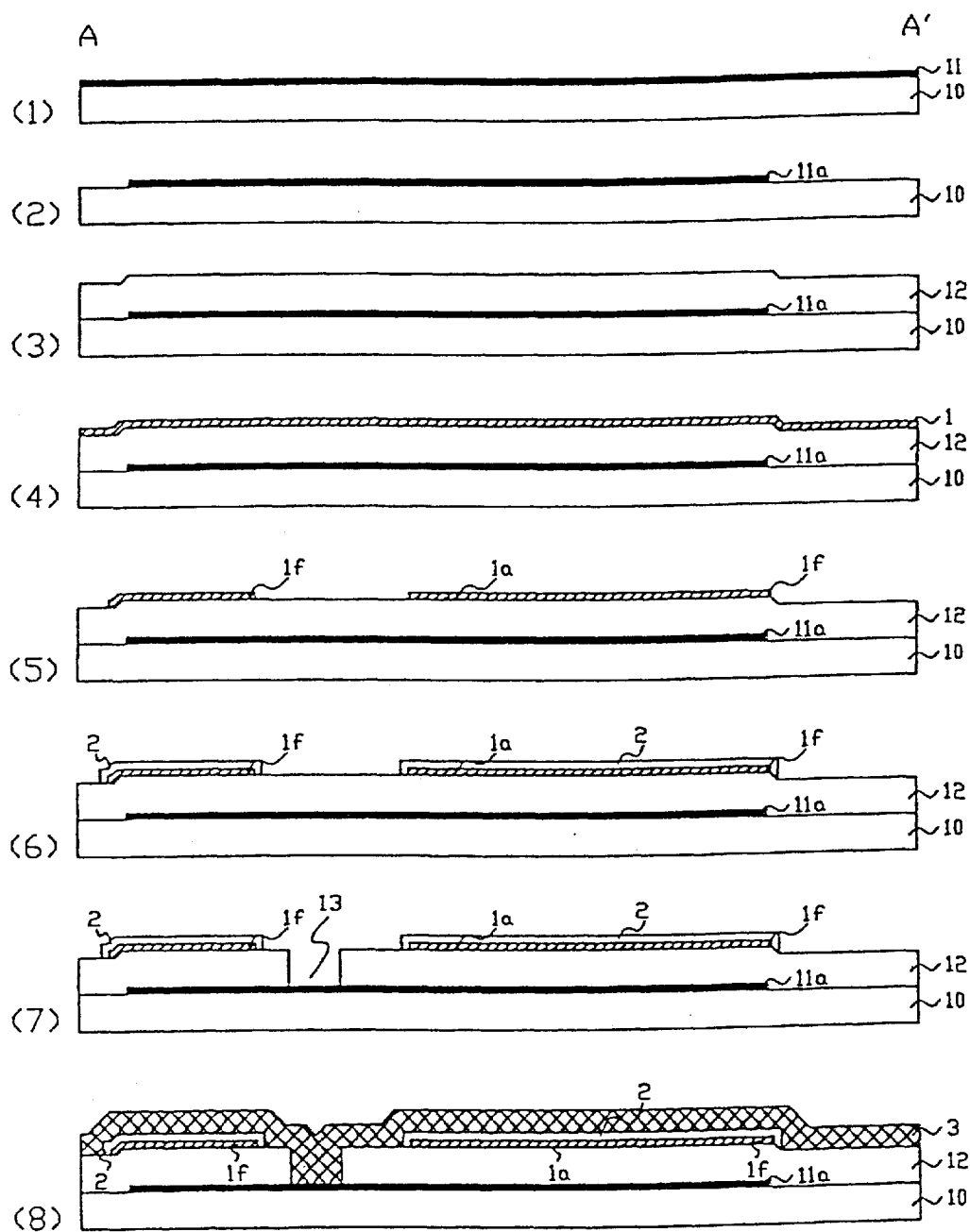
FIG. 6 is a process diagram (Part 1) illustrating, in sequential order, the manufacturing process of the first embodiment of the liquid crystal device.

As shown in process (1) in FIG. 6, a TFT array substrate 10 such as a quartz substrate, a hard glass substrate, or a silicone substrate is prepared. Here, it is preferable that pre-processing be performed by annealing under an inert atmosphere of $N_2$ (nitrogen) and at high temperature of around 900 to 1300° C., so as to reduce the amount of warping of the TFT array substrate 10 in the later-performed high-temperature process. That is, the TFT array substrate 10 is subjected to thermal processing at a temperature which is equal to or higher than the highest temperature in the thermal processing of the manufacturing process.

A metal alloy film of metal or metal silicide or the like of Ti, Cr, W, Ta, Mo, Pb or the like is formed by sputtering on the entire surface of the TFT array substrate 10 thus processed, to a film thickness of around 100 to 500 nm, preferably to a film thickness of around 200 nm, thereby forming a light-shielding film 11.

Next, as shown in process (2), etching is performed to the light-shielding film 11, thereby forming a first light-shielding film 11a.

Next, as shown in process (3), formed by atmospheric or reduced pressure CVD or the like on top of the first light-shielding film 11a is a first inter-layer insulating film 12, made up of: a silicate glass film such as NSG (non-silicate glass), PSG (phosphorous-silicate glass), BSG (boron-silicate glass), and BPSG (boron-phosphorous-silicate glass); and a silicone nitride film; and a silicone oxide film, or the like; using TEOS (tetraethyl ortho silicate) gas, TEB (tetraethyl botrate) gas, TMOP (tetraethyl oxy phosrate) or the like. The film thickness of this first inter-layer insulating film 12 is, for example, 500 to 2000 nm.

Next, as shown in process (4), an amorphous silicone film is formed on the first inter-layer insulating film 12, in a relatively low-temperature environment of approximately 450 to 500° C., preferably approximately 500° C., by reduced pressure CVD (for example, CVD with pressure around 20 to 40 Pa) using monosilane gas, silane gas, or the like, at a flow of approximately 400 to 600 cc/min. Subsequently, annealing processing is performed in a nitrogen atmosphere at approximately 600 to 700° C. for approximately 1 to 10 hours, preferably 4 to 6 hours, thereby causing solid phase growth of a poly-silicone film 1 to a thickness of approximately 50 to 200 nm, preferably approximately 100 nm.

At this time, in the case of creating an n-channel type pixel switching TFT 30 as the pixel switching TFT 30 shown in FIG. 3, doping may be performed by minute ion injection or the like of impurity ions of Group V elements such as Sb (antimony), As (arsenic), and P (phosphorous). Also, in the case of creating a p-channel type pixel switching TFT 30, doping may be performed by minute ion injection or the like of impurity ions of Group III elements such as B (boron), Ga (gallium), and In (indium). Incidentally, the poly-silicone film 1 may be directly formed by reduced pressure CVD or the like without the amorphous silicone film. Or, silicone ions may be driven into the poly-silicone film deposited by reduced pressure CVD or the like and temporarily making it non-crystalline (amorphize), and then re-crystallized by annealing processing or the like to form the poly-silicone film 1.

Next, as shown in process (5), a semiconductor layer 1a of a certain pattern such as shown in FIG. 2 is formed. That is, particularly, first storage capacitor electrodes If extended from the semiconductor layer 1a comprising the pixel switching TFT 30 are formed in the area where capacitance lines 3b are formed under the data lines 6a and in the area where the capacitance lines 3b are formed parallel to the scanning lines 3a.

Next, as shown in process (6), the semiconductor layer 1a comprising the pixel switching TFT 30 and the first storage capacitor electrodes 1f are both subjected to thermal oxidizing at high temperature of around 900 to 1300° C., preferably at a temperature of approximately 1000° C., thereby forming a thermal-oxidized silicone film of a relatively thin thickness of approximately 30 nm, and further a high-temperature oxidized silicone film (HTO film) or silicone nitrite film is formed to a relatively thin thickness of approximately 50 nm by reduced pressure CVD or the like, thereby forming an insulating thin film 2 serving as both the gate insulating film of the pixel switching TFT 30 having a multi-layer structure and a dielectric film for forming a capacitor (see FIG. 3). Consequently, the thickness of the semiconductor layer 1a and first storage capacitor electrode 1f is approximately 30 to 150 nm in thickness, preferably 35 to 50 nm in thickness, and the thickness of the insulating thin film 2 is approximately 20 to 150 nm in thickness, preferably 30 to 100 nm in thickness. By reducing the amount of high-temperature thermal oxidizing time, bowing due to heat can be prevented, particularly in the case of using large substrates of around 8 inches. However, an insulating thin film 2 having a single-layer structure may be formed by only subjecting the poly-silicone film 1 to thermal oxidizing.

Incidentally, while not particularly restricted in process (6), the semiconductor layer portion serving as the first storage capacitor electrode 1f may be doped with P ions at a dose of approximately $3 \times 10^{12}/cm^2$, thereby lowering resistance.

Next, in process (7), the contact holes 13 reaching the first light-shielding film 11a are opened in the first inter-layer insulating film 12, by means of dry etching such as reactive ion etching or reactive ion beam etching, or wet etching. In this case, opening the contact holes 13 and the like by anisotropic etching such as reactive ion etching or reactive ion beam etching is advantageous in that the hole form can be approximately matched with the mask form. However, combining dry etching and wet etching is advantageous in that the contact holes 13 and the like can be tapered, thus breaking of wiring can be prevented at the time of connecting the wiring.

Next, as shown in process (8), following depositing the poly-silicone film 3 by reduced pressure CVD or the like, P is subjected to thermal dispersion, thereby making the poly-silicone film 3 conductive. Or, a doped silicone film wherein the P ions are introduced at the same time as forming the poly-silicone film 3.

Figure 7:
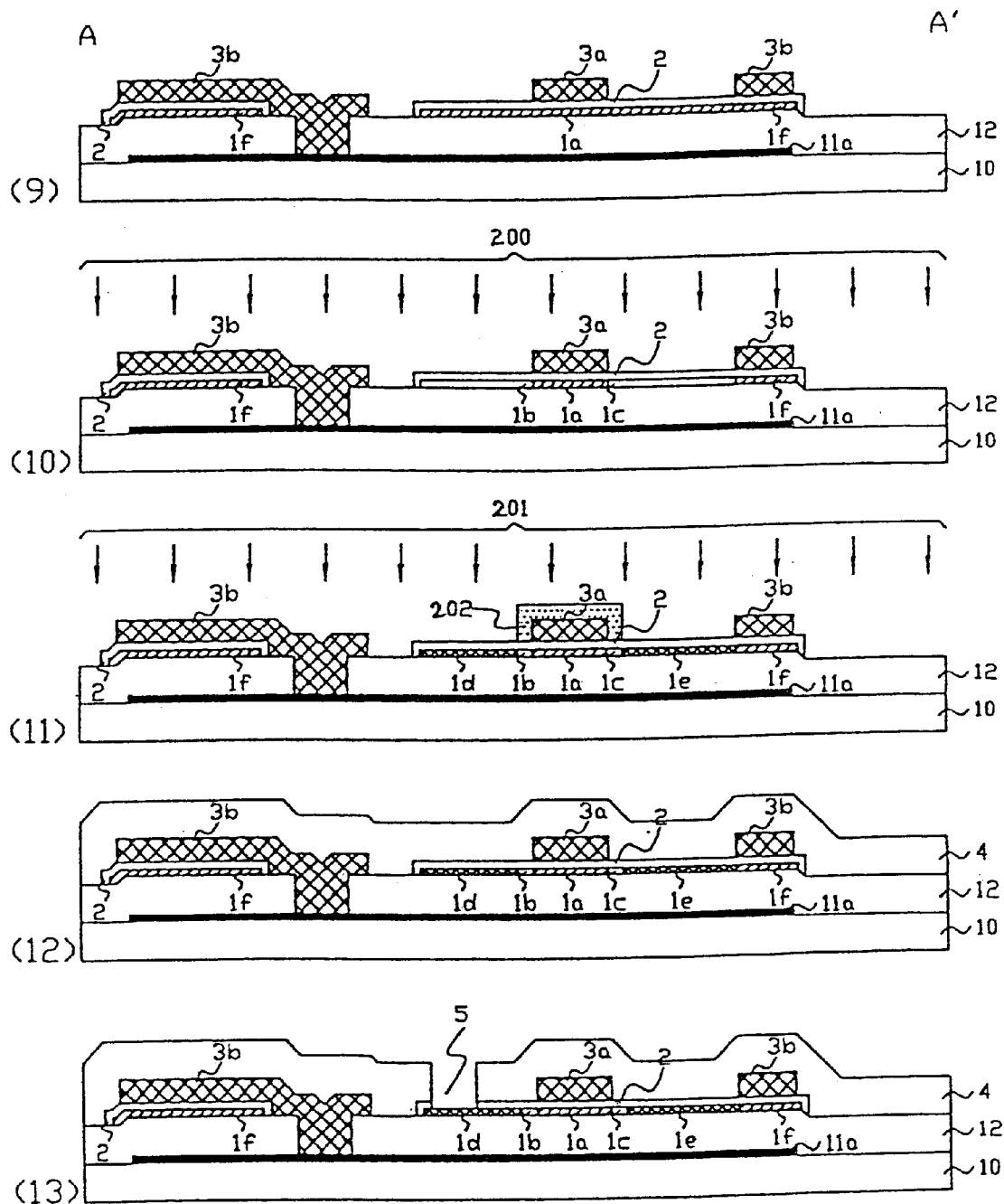
FIG. 7 is a process diagram (Part 2) illustrating, in sequential order, the manufacturing process of the first embodiment of the liquid crystal device.

Next, as shown in process (9) in FIG. 7, capacitance lines 3b are formed at the same time as the scanning lines 3a of a certain pattern shown in FIG. 2. The film thickness of the scanning lines 3a and capacitance lines 3b is, for example, approximately 350 nm.

Next, as shown in process (10), in the case of making the pixel switching TFT 30 shown in FIG. 3 to be an n-channel TFT having an LDD structure, in order to first form the low-concentration source area 1b and the low-concentration drain area 1c on the semiconductor layer 1a, Group V impurity ions 60 such as P are used to dope at a low concentration (for example, a dose of P ions of approximately 1 to $3\times10^{13}$/cm$^2$), with the gate electrode comprising a portion of the scanning line 3a as a dispersion mask. Thereby, the semiconductor layer 1a underneath the scanning line 3a becomes the channel area 1a'. The resistance of the capacitance lines 3b and scanning lines 3a are reduced due to this impurity ion doping.

Next, as shown in process (11), in order to first form the high-concentration source area 1d and the high-concentration drain area 1e, a resist layer 202 formed of mask wider than the scanning line 3a is formed over the scanning line 3a, following which Group V impurity ion 201 such as P or the like again are used to dope at a high concentration (for example, a dose of P ions of approximately 1 to $3\times10^{15}$/cm$^2$). Also, in the case of making the pixel switching TFT 30 to be a p-channel type, in order to first form the low-concentration source area 1b and the low-concentration drain area 1c, and the high-concentration source area 1d and the high-concentration drain area 1e, on the semiconductor layer 1a, Group III impurity ions such as B (boron) are used for doping. Incidentally, instead of using low-concentration impurity ions, the TFT may be made to have an offset structure, wherein the gate electrode which is a part of the scanning line 3a is used as a mask and a self-aligning TFT is formed by ion injection techniques using P ions and B ions.

The resistance of the capacitance lines 3b and scanning lines 3a are further reduced due to this impurity ion doping.

Also, a p-channel TFT can be formed by repeating process (10) and process (11), and using Group III impurity ions such as B ions. Accordingly, a data line driving circuit 101 and a scanning line driving circuit 104 having a complementary structure can be formed in the peripheral portion on the TFT array substrate 10 out of the n-channel TFTs and the p-channel TFTs. In this way, forming the semiconductor layer 1a making up the pixel switching TFT 30 out of a poly-silicone film is advantageous from a manufacturing perspective, since the data line driving circuit 101 and the scanning line driving circuit 104 can be formed at the time of forming the pixel switching TFT 30 with approximately the same process.

Next, as shown in process (12), a second inter-layer insulating film 4 formed of a silicate glass film such as NSG, PSG, BSG, BPSG, silicone nitride film or silicone oxide film, or the like, is formed: by atmospheric or reduced pressure CVD or TEOS gas or the like so as to cover the scanning lines 3a of the pixel switching TFT 30 and also the capacitance lines 3b. It is preferable that the film thickness of the second inter-layer insulating film 4 be approximately 500 to 1500 nm.

Next, at the stage of process (13), annealing processing is performed for around 20 minutes at approximately 1000° C. in order to activate the high-concentration source area 1d and the high-concentration drain area 1e, following which contact holes 5 to the data lines 6a are formed by means of dry etching such as reactive ion etching or reactive ion beam etching, or wet etching. Also, contact holes for connecting the scanning lines 3a and the capacitance lines 3b with unshown wiring are opened in the second inter-layer insulating film 4 by the same process as contact hole 5.

Figure 8:
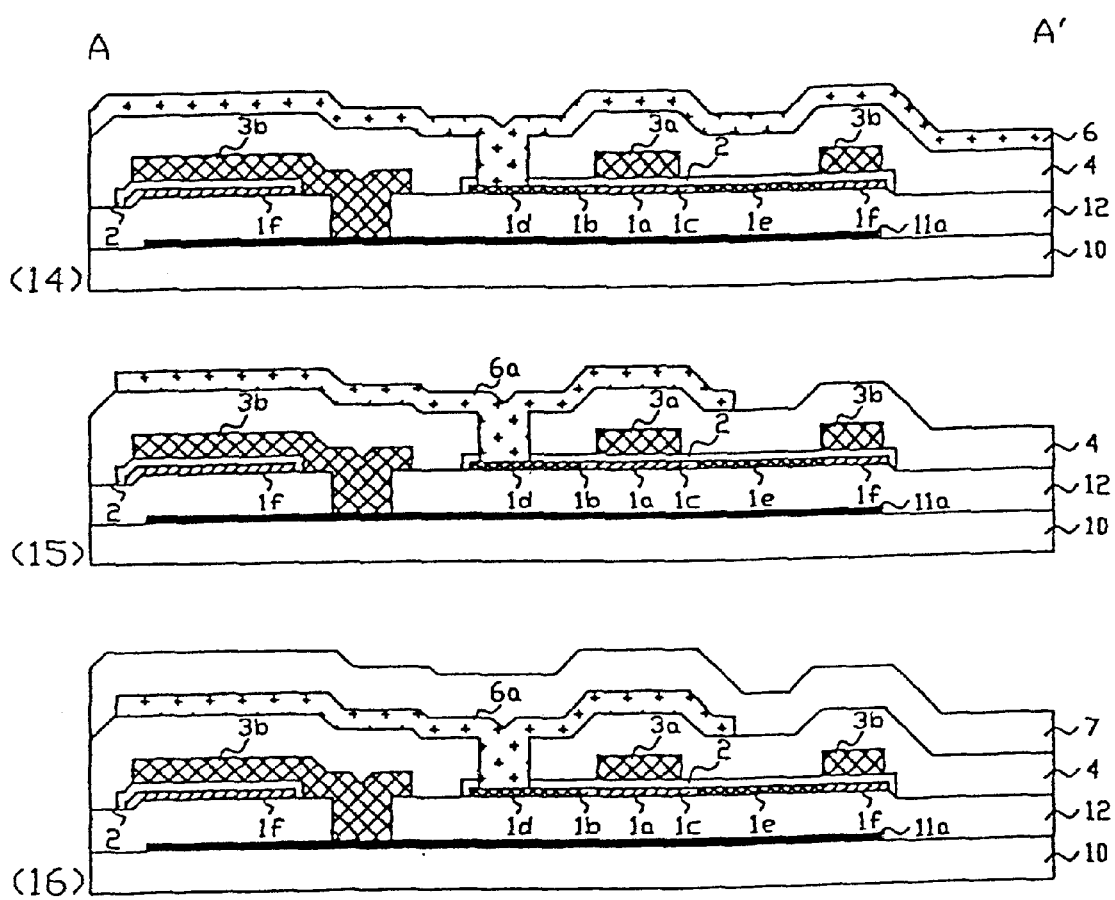
FIG. 8 is a process diagram (Part 3) illustrating, in sequential order, the manufacturing process of the first embodiment of the liquid crystal device.

Next, as shown in process (14) shown in FIG. 8, a metal film 6 is formed by sputtering or the like of a low-resistance metal such as light-shielding Al or the like, or metal silicide, onto the second inter-layer insulating film 4, and deposited to a thickness of approximately 100 to 500 nm, preferably to 300 nm, and further as shown in process (15), data lines 6a are formed by a photo-lithography process, etching process, or the like.

Next, as shown in process (16), a third inter-layer insulating film 7 formed of a silicate glass film such as NSG, PSG, BSG, BPSG, silicone nitride film or silicone oxide film, or the like, is formed by using atmospheric or reduced pressure CVD or TEOS gas or the like so as to cover the data lines 6a. It is preferable that the film thickness of the third inter-layer insulating film 7 be approximately 500 to 1500 nm.

Figure 9:
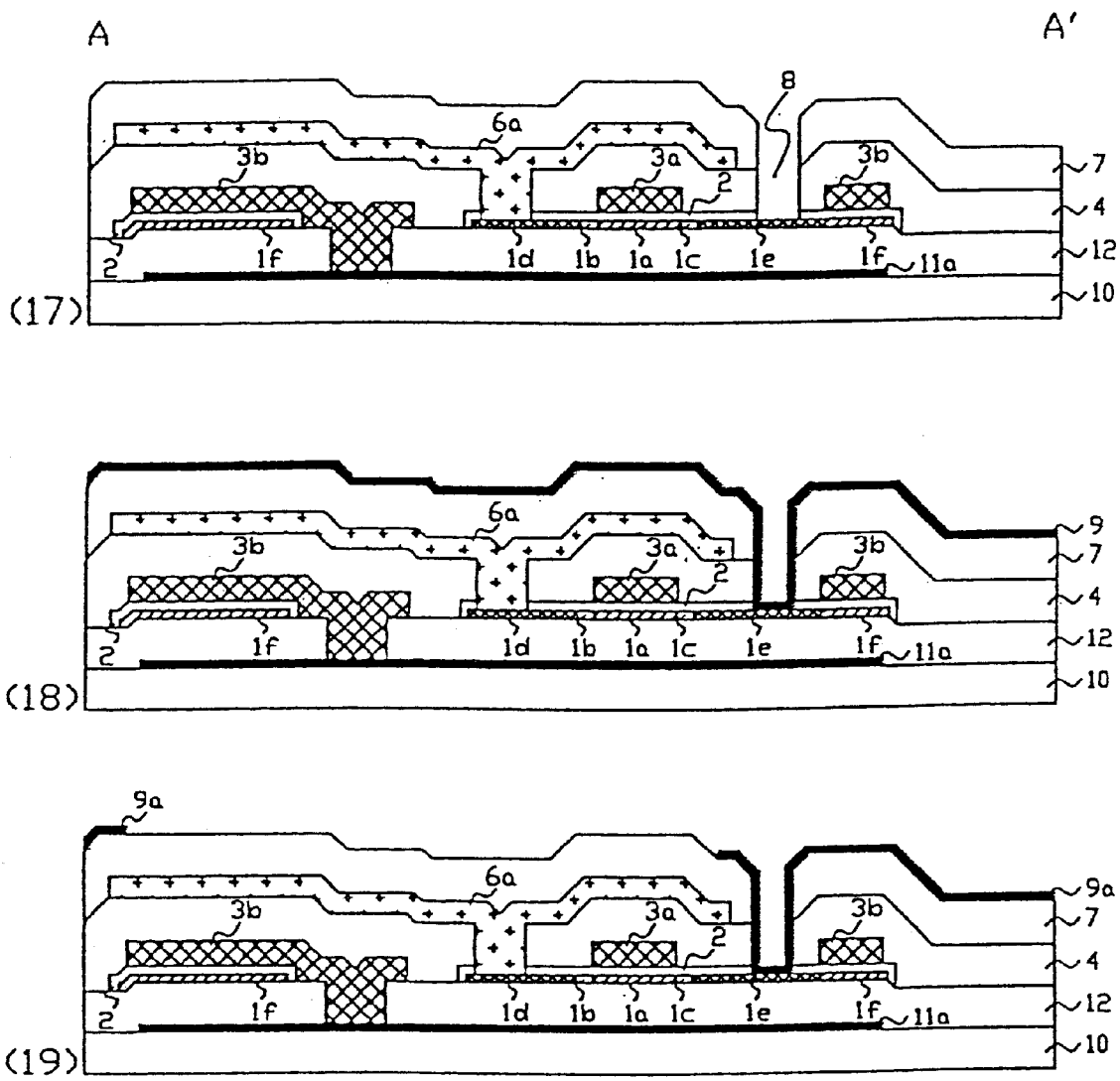
FIG. 9 is a process diagram (Part 4) illustrating, in sequential order, the manufacturing process of the first embodiment of the liquid crystal device.

Next, at the stage of process (17) in FIG. 9, contact holes 8 for electrically connecting the pixel electrodes 9a and the high-concentration drain area 1e are formed in the pixel switching TFT 30 by means of dry etching such as reactive ion etching or reactive ion beam etching.

Next, as shown in process (18), a transparent conductive thin film 9 of an ITO film or the like is deposited onto the third inter-layer insulating film 7 to a thickness of approximately 50 to 200 nm by sputtering or the like, and as shown in process (19), forming the pixel electrodes 9a. Incidentally, in the event that this liquid crystal device is to be used as a reflection-type liquid crystal device, the pixel electrodes 9a may be formed of a non-transparent material with high reflectivity, such as Al.

Next, after an application fluid for a polyimide alignment film is applied onto the pixel electrodes 9a, an alignment film 16 (see FIG. 3) is formed by performing rubbing processing in a certain direction so as to have a certain pre-tilt angle.

On the other hand, regarding the opposite substrate 20 shown in FIG. 3, a glass substrate or the like is first prepared, and a second light-shielding film 23 and a later-described third light-shielding film serving as a frame (see FIG. 18 and FIG. 19) are formed following sputtering by metal chromium, for example, by a photo-lithography process, etching process, or the like. These second light-shielding films may be formed of a metal material such as Cr, Ni (nickel), Al, and so forth, of a material such as resin black created by dispersing carbon and Ti in a photo resist.

Subsequently, an opposite electrode 21 is formed by depositing a transparent conductive thin film of an ITO film or the like over the entire surface of the opposite substrate 20 to a thickness of approximately 50 to 200 nm, by means of sputtering or the like. Further, after an application fluid for a polyimide alignment film is applied to the entire surface of the opposite electrode 21, an alignment film 22 (see FIG. 3) is formed by performing rubbing processing in a certain direction so as to have a certain pre-tilt angle.

Finally, the TFT array substrate 10 with each layer formed as described above, and the opposite substrate 20 are adhered to one another with the alignment films 16 and 22 facing one another by a sealing material 52, and a liquid crystal mixed with a plurality of types of nematic liquid crystals mixed therein for example, is sucked into the space between the substrates by vacuum suction or the like, thereby forming the liquid crystal layer 50 of a certain film thickness.

(Second Embodiment of the Liquid Crystal Device)

The second embodiment of the liquid crystal device according to the present invention will be described with reference to FIG. 10.

In the above-described first embodiment, the first light-shielding film 11a is provided in a screen-like manner parallel to the pixels, whereby lowering of resistance of the capacitance lines 3b is promoted, and further the degree of redundancy of the structure is increased, but with the second embodiment, the first light-shielding film 11a is provided in strips. As for the other configurations, these are the same as those of the first embodiment, so the components in the Figure which are the same are denoted with the same reference numerals, and description thereof is omitted. Now, FIG. 10 is a plan view of a plurality of pixel groups neighboring on a TFT array substrate upon which are formed data lines, scanning lines, pixel electrodes, light-shielding films, or the like.

Figure 10:
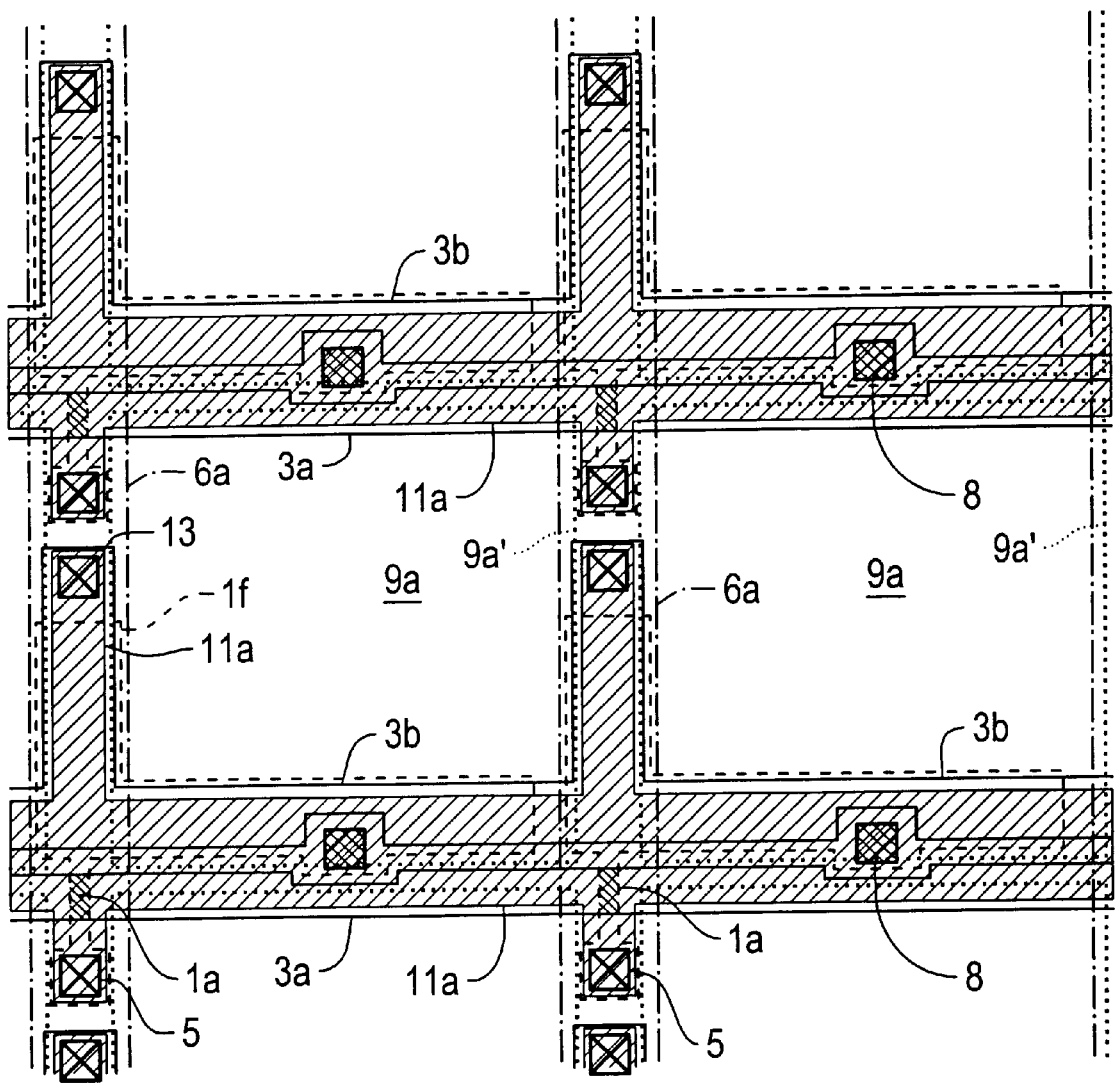
FIG. 10 is a plan view of a plurality of pixel groups neighboring on a TFT array substrate upon which are formed data lines, scanning lines, pixel electrodes, light-shielding films, or the like, according to a second embodiment of the liquid crystal device.

In FIG. 10, the first light-shielding films 11a are comprised of a plurality of strips that extend parallel to scanning lines 3a. That is, the first light-shielding films 11a are separated at certain areas facing the data lines 6a. Accordingly, lowering of resistance of the capacitance lines 3b electrically connected to the first light-shielding films 11a can be promoted, particularly in the direction parallel to the scanning lines 3a. Also, the degree of redundancy in structure between the capacitance lines 3b and the first light-shielding films 11a can be increased.

Further, as a variation of the second embodiment, an arrangement may be used wherein the first light-shielding films 11a are provided in strips to portions where the scanning lines 3a and capacitance lines 3b are overlapped when viewed from the side of the TFT array substrate 10, wherein the plurality of portions arrayed parallel to the scanning lines 3a are mutually electrically connected via the capacitance lines 3b. In this configuration as well, lowering of resistance of the capacitance lines 3b can be promoted, and the degree of redundancy in structure can be increased.

(Third Embodiment of the Liquid Crystal Device)

The third embodiment of the liquid crystal device according to the present invention will be described with reference to FIG. 11.

In the above-described first embodiment, the first light-shielding film 11a is provided in a screen-like (grid-like) manner, whereby lowering of resistance of capacitance lines 3b is promoted, and further the degree of redundancy of the structure is increased, but with the third embodiment, the first light-shielding film 11a is provided in strips, and is not formed at positions opposing the scanning lines 3a, except for portions covering the channel areas 1a'. As for the other configurations, these are the same as those of the first embodiment, so the components in the Figure which are the same are denoted with the same reference numerals, and description thereof is omitted. Now, FIG. 11 is a plan view of a plurality of pixel groups neighboring on a TFT array substrate upon which are formed data lines, scanning lines, pixel electrodes, light-shielding films, or the like, according to a third embodiment of the liquid display device.

Figure 11:
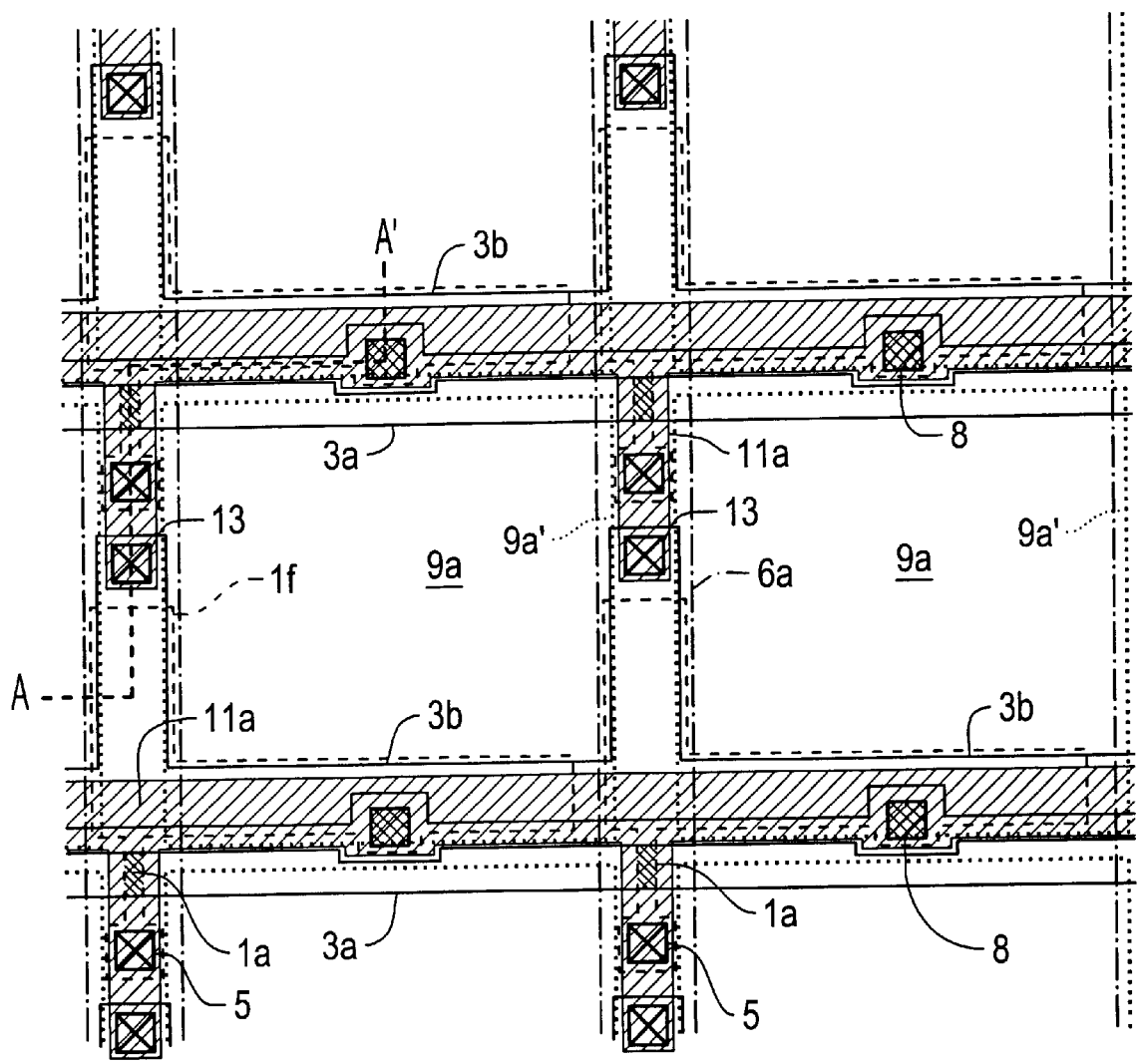
FIG. 11 is a plan view of a plurality of pixel groups neighboring on a TFT array substrate upon which are formed data lines, scanning lines, pixel electrodes, light-shielding films, or the like, according to a third embodiment of the liquid crystal device.

As shown in FIG. 11, first light-shielding films 11a are each provided between the TFT array substrate 10 and each pixel switching TFT 30, at positions each opposing the pixel switching TFTs 30.

Also, as shown in FIG. 11, with the present embodiment, the first light-shielding films 11a are electrically connected to the capacitance lines 3b at the neighboring capacitance lines 3b of the previous tier or following tier, via the contact holes 13. Accordingly, in comparison with the case wherein the first light-shielding films 11a are electrically connected to the capacitance lines of their own tier, the offset at the area along the edge of the opening area of the pixel portions where capacitance lines 3b and first light-shielding films 11a are formed over the data lines 6a can be made smaller with regard to other areas. In the case that the offset at the area along the edge of the opening area of the pixel portions is small, as in this case, liquid crystal disclination (defective alignment) of the liquid crystal caused by the offset can be reduced, which can make the opening area of the pixel portions be widened.

Also, the first light-shielding films 11a are arranged so that contact holes 13 are opened in protrusions protruding from the main line linearly extending as described above. Now, the present Inventor has found by research that the closer the contact holes 13 are to the edge, the harder it is for cracking to occur, owing to reasons such as divergence of stress from the edge. Accordingly, depending on how close to the tip of the protrusion the contact hole 13 is opened (preferably, according to how close to the tip at the limit of the margin), the stress placed on the first light-shielding film 11a during the manufacturing process is relieved, cracking can be prevented more effectively, and yield can be improved.

Particularly, with the present embodiment, the first light-shielding film 11a is not formed at positions opposing the scanning lines 3a, except for portions covering the channel areas 1a'. Accordingly, there is practically no capacitance coupling between the light-shielding film 11a and respective scanning lines 3a, so there is no potential fluctuation in the light-shielding film 11a due to potential fluctuation in the scanning lines 3a, and consequently, there is no potential fluctuation in the capacitance lines 3b.

Incidentally, with the third embodiment, the capacitance lines 3b are connected to the first light-shielding films 11a at the neighboring capacitance lines 3b of the previous tier or following tier, so there is the need for capacitance lines 3b for supplying a constant potential to the first light-shielding film 11a at the pixel at the highest tier or the lowest tier. Accordingly, one extra capacitance line 3b is provided in regard to the vertical number of pixels.

Also, in FIG. 11, the main line portions of the first light-shielding films 11a are formed so as to be practically laid over the linear main line portions of the capacitance lines 3b, but the functions of shielding light from the TFTs and the functions of reducing the resistance regarding the capacitance lines 3b can be exhibited so long as the light-shielding films 11a are provided at positions covering the channel areas of the TFTs 30 and be overlapped with the capacitance lines 3b at some portions so that the contact holes 13 can be formed. Accordingly, the light-shielding films 11a can be provided even to elongated gap areas parallel to the scanning lines between the neighboring scanning lines 3a and capacitance lines 3b, or to positions slightly overlapping the scanning lines 3a.

(Fourth Embodiment of the Liquid Crystal Device)

The fourth embodiment of the liquid crystal device according to the present invention will be described with reference to FIG. 12.

With the above-described first through third embodiments, the portions of the first light-shielding films 11a parallel to the scanning lines 3a and capacitance lines 3b are generally formed underneath the capacitance lines 3b, but with the fourth embodiment, the portions of the first light-shielding films 11a parallel to the scanning lines 3a and capacitance lines 3b are generally formed underneath the scanning lines 3a in a strip form, and are not formed underneath the capacitance lines 3b. As for the other configurations, these are the same as those of the first embodiment, so the components in the Figure which are the same are denoted with the same reference numerals, and description thereof is omitted. Now, FIG. 12 is a plan view of a plurality of pixel groups neighboring on a TFT array substrate upon which are formed data lines, scanning lines, pixel electrodes, light-shielding films, and the like.

Figure 12:
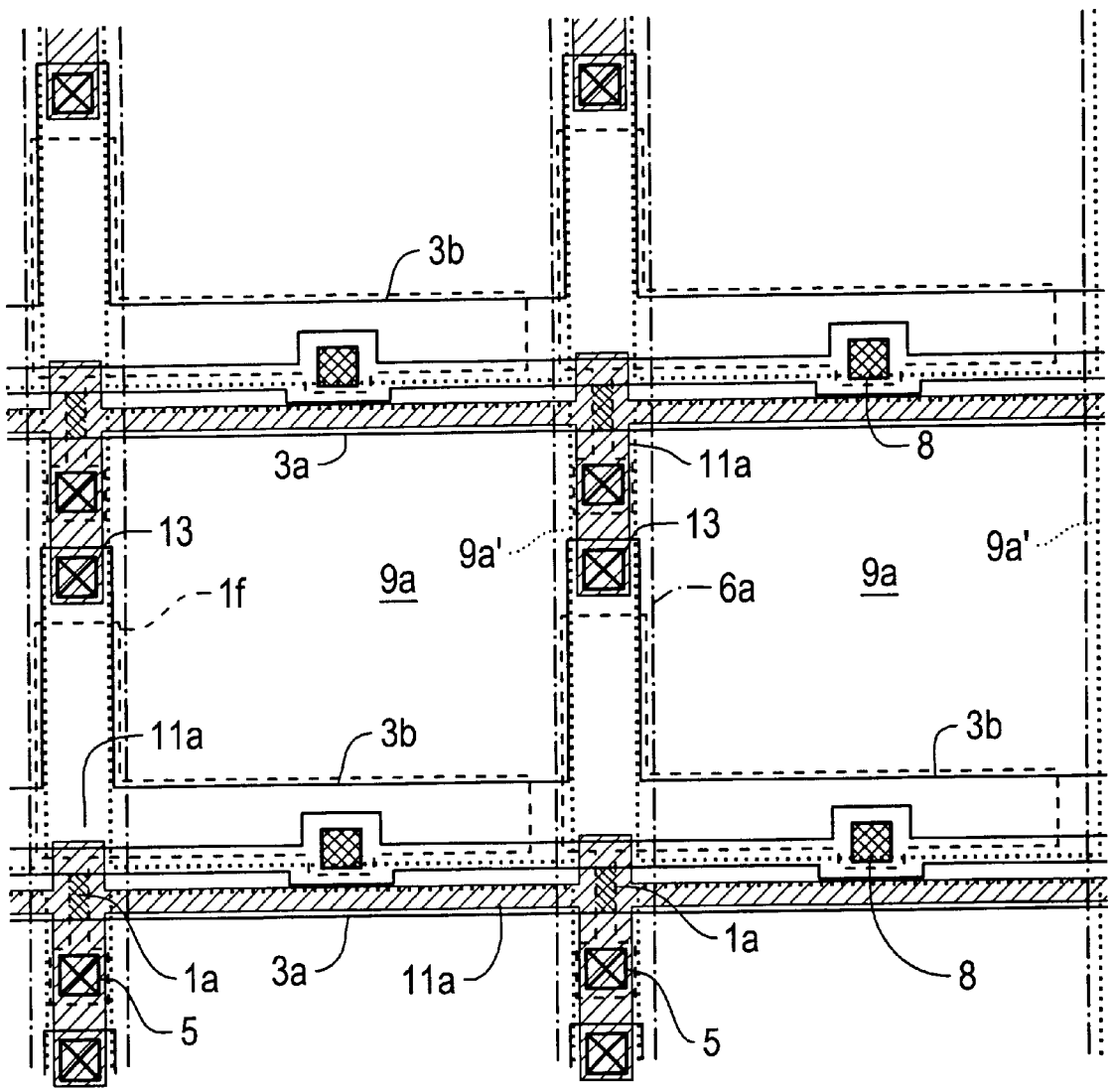
FIG. 12 is a plan view of a plurality of pixel groups neighboring on a TFT array substrate upon which are formed data lines, scanning lines, pixel electrodes, light-shielding films, or the like, according to a fourth embodiment of the liquid crystal device.

In FIG. 12, particularly, with the liquid crystal device, the main line portions of the strips of first light-shielding films 11a extending along the scanning line 3a are provided beneath the scanning lines 3a. That is, scanning lines 3a are formed on the light-shielding films 11a at this main portion, with a first inter-layer insulating film that is much thicker than the gate insulating film which may consist of the TFTs in the pixel portions, for example, introduced therebetween. Accordingly, even in the event that an unintended abnormal formation such as a protrusion or the like happens to be formed on the light-shielding film 11a during the manufacturing process, the probability of this protrusion or the like perforating the first inter-layer insulating film and thereby short-circuiting the scanning lines 3a can be vastly reduced.

In cases wherein a semiconductor layer 11a, gate insulating film 2, and capacitance lines 3b are further layered and formed upon such a protrusion formed on the light-shielding film 11a, as in the above first through third embodiments (see FIG. 3), the configuration according to the fourth embodiment wherein the light-shielding films 11a are formed at positions facing the scanning lines 3a is advantageous in terms of improved yield, when the increase in the probability of this protrusion or the like perforating extremely thin gate insulating film 2 through the semiconductor layer 1a and thereby short-circuiting the semiconductor layer 1a and the capacitance lines 3b is taken into consideration.

Accordingly, further, from this perspective of improving yield, it is preferable that the area on the substrate wherein the light-shielding films 11a and the capacitance lines 3b face one another is reduced as much as possible, and that the area on the substrate wherein the light-shielding films 11a and scanning lines 3a face one another is widened as much as possible. Accordingly, with the fourth embodiment, as shown in FIG. 12, the light-shielding films 11a does not face the capacitance lines 3b except at areas minimally necessary for electrically connecting the light-shielding films 11a and the capacitance lines 3b via the contact holes 13 and the areas minimally necessary for shielding the channel areas (the areas hatched from the upper left to the lower right in the Figure) of the TFTs 30 from light, and rather faces the scanning lines 3a.

As a result of the above, according to the fourth embodiment, even in an arrangement wherein the light-shielding films 11a are used for reducing the resistance of the capacitance lines 3b, the probability of the capacitance lines 3b and semiconductor layer positioned in an opposing manner across an extremely thin insulating film short-circuiting is hardly increased or is not increased at all, and consequently the yield of this liquid crystal device can be improved.

(Fifth Embodiment of the Liquid Crystal Device)

The fifth embodiment of the liquid crystal device according to the present invention will be described with reference to FIG. 13.

With the above-described first through fourth embodiments, the planar form of the contact holes 13 for electrically connecting the capacitance lines 3b and the first light-shielding films 11a is a square, but with the fifth embodiment, the planar form of the contact holes is a circular form such as a true circle or an ellipse. As for the other configurations, these are the same as those of the first through fourth embodiments, and the present embodiment is an arrangement wherein the form of the contact holes 13 in the third embodiment are changed, so the components in the Figure which are the same are denoted with the same reference numerals, and description thereof is omitted. Now, FIG. 13 is a plan view of a plurality of pixel groups neighboring on a TFT array substrate upon which are formed data lines, scanning lines, pixel electrodes, light-shielding films, and the like.

Figure 13:
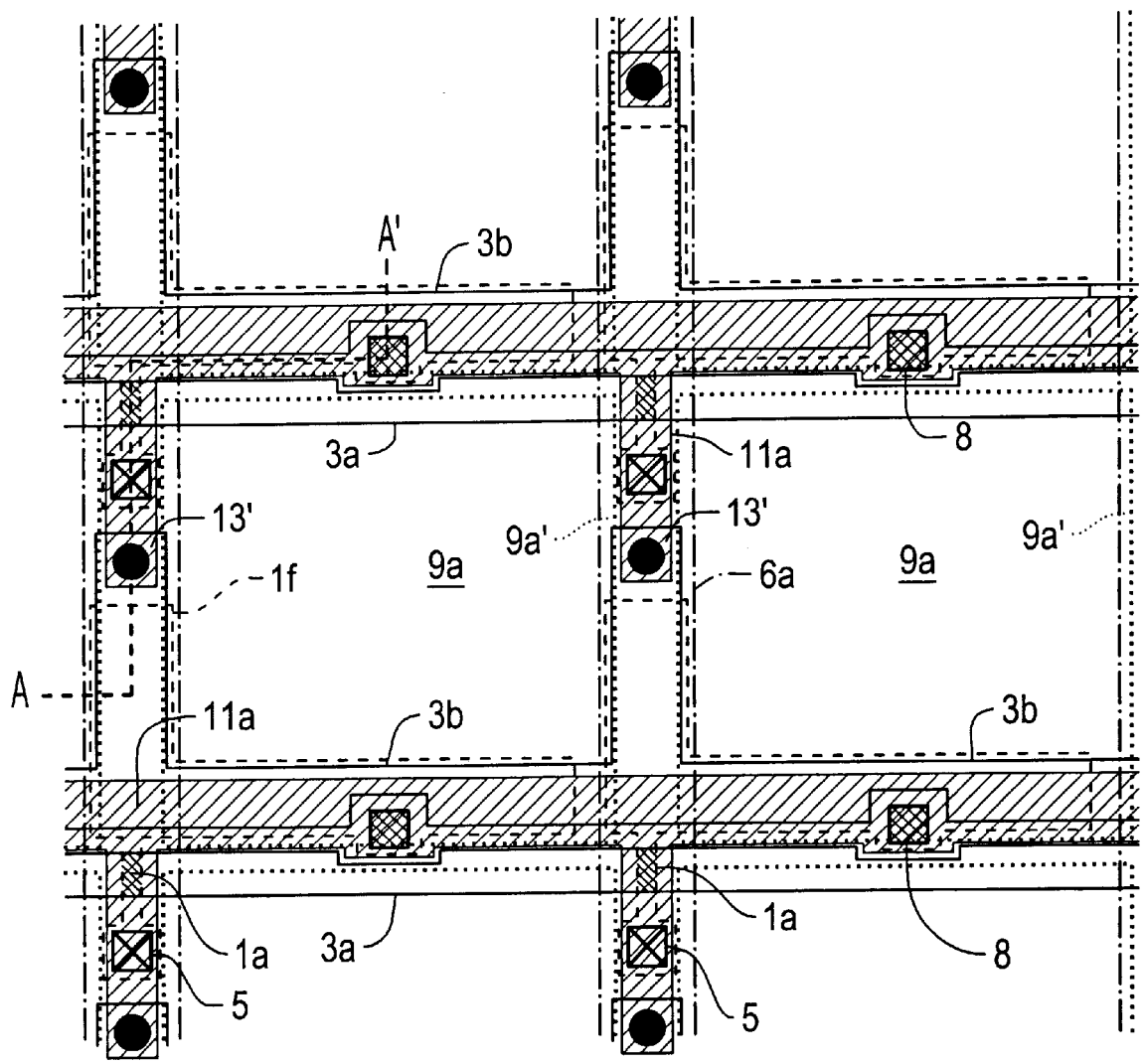
FIG. 13 is a plan view of a plurality of pixel groups neighboring on a TFT array substrate upon which are formed data lines, scanning lines, pixel electrodes, light-shielding films, or the like, according to a fifth embodiment of the liquid crystal device.

In FIG. 13, the contact holes 13 for electrically connecting the capacitance lines 3b and first light-shielding films 11a a have a circular form as the planar form thereof parallel to the substrate.

According to this configuration, in the event that a wet etching process is used as the manufacturing process for opening the contact holes 13, the probability of the etching solution seeping in the interface between the first light-shielding films 11a and the first inter layer insulating films 12 so as to cause cracking can be reduced. That is, as with the third embodiment, in the event that one attempts to open contact holes 13 of a square planar form or the like at its corner portions by wet etching, the etching solution particularly easily seeps in at the corner portions and also stress tends to be concentrated at such portions, thus cracking easily occurs on the first light-shielding films 11a or the like at such corners.

Conversely, in the event that the contact holes 13 in the first embodiment are to be opened using the dry etching process, there is the possibility that the etching may pass through the extremely thin first light-shielding film 11a, regarding the selection ratio between the first inter-layer insulating film 12 and first light-shielding film 11a. Accordingly, the wet etching process using round contact holes 13' as with the present embodiment is extremely advantageous in practical applications, from the perspective of preventing perforation and cracking.

According to the above, according to the fifth embodiment, the reliability of the wiring near the contact hole can be increased, and the yield of the liquid crystal device can be improved. An example has been shown wherein the form of the contact holes 13 of the present embodiment is an arrangement wherein the form of the contact holes 13 in the third embodiment are changed, but the present embodiment can also be applied to the first embodiment, second embodiment, and fourth embodiment.

(Sixth Embodiment of the Liquid Crystal Device)

The sixth embodiment of the liquid crystal device according to the present invention will be described with reference to FIG. 14.

With the above-described first through fifth embodiments, the first light-shielding films 11a are electrically connected to the capacitance lines 3b at the neighboring capacitance lines 3b of the previous tier or following tier via the contact holes 13 or 13', but with the sixth embodiment, each of the light-shielding films are electrically connected to its own capacitance line. As for the other configurations, these are the same as those of the fifth embodiment, so the components in the Figure which are the same are denoted with the same reference numerals, and description thereof is omitted. Now, FIG. 14 is a plan view of a plurality of pixel groups neighboring on a TFT array substrate upon which are formed data lines, scanning lines, pixel electrodes, light-shielding films, and the like.

Figure 14:
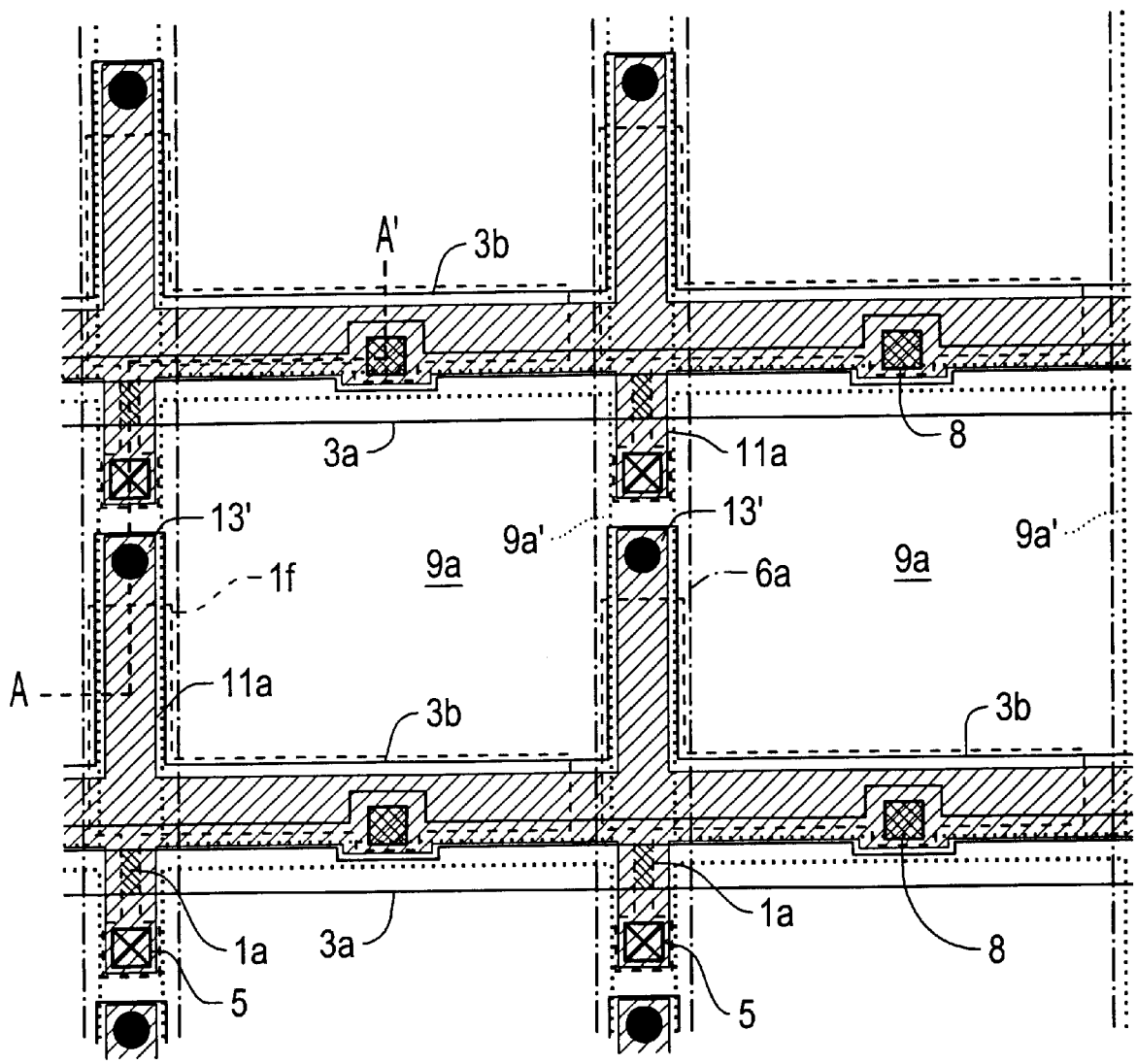
FIG. 14 is a plan view of a plurality of pixel groups neighboring on a TFT array substrate upon which are formed data lines, scanning lines, pixel electrodes, light-shielding films, or the like, according to a sixth embodiment of the liquid crystal device.

In FIG. 14, the first light-shielding films 11a are provided to positions covering the TFTs including the channel areas of the semiconductor layer 1a in the pixel portions, when viewed from the side of the TFT array substrate, and further, each has a main line portion extended linearly in parallel with the scanning lines 3a while facing the linear main line portion of the capacitance lines 3b, protruding portions protruding towards the next tier (namely, downwards in the Figure) in parallel with the data lines 6a from the places at which they intersect with the data lines 6a, and protruding portions protruding towards the previous tier (namely, upwards in the Figure) following the data lines 6a from the places at which they intersect with the data lines 6a.

The downward protruding portions of the first light-shielding films 11a cover the channel area, and further, extend downward until the position, to cover the contact holes 5.

On the other hand, the upward protruding portions of the first light-shielding films 11*a* are overlapped on the upwards protruding portions on the capacitance Lines 3*b* beneath the data lines 6*a*, and round contact holes 13 electrically connecting the first light-shielding films 11*a* and the capacitance lines 3*b* are provided at around the tips of this overlapping portion. That is, according to the present embodiment, the first light-shielding film 11*a* in each tier (namely, each pixel line) is electrically connected to its own capacitance line 3*b* by the contact holes 13'.

According to this configuration, the offset of the area where the TFTs 30, the capacitance lines 3*b*, and the first light-shielding films 11*a* are formed over the data lines 6*a* for other areas increases, but the capacitance lines 3*b* and the first light-shielding films 11*a* can be electrically connected relatively easily.

Further, according to this configuration, the upward protruding portion of the first light-shielding film 11*a* also overlaps with the first storage capacitor electrode 1*f*, thus there is the advantage of increasing the storage capacitor 70 formed between the first light-shielding film 11*a* and the first storage capacitor electrode 1*f* serving as the third storage capacitor electrode, using the space under the data line 6*a*.

Also, in the present embodiment as with the case of the third embodiment, the contact holes may be formed of a square and the capacitance lines and the light-shielding films of their own tier may be electrically connected. Also, with the third embodiment, the capacitance lines 3*b* and the first light-shielding films 11*a* of the pixels in their own tier are connected, so there is no need to provide an extra capacitance line 3*b* to the top or bottom pixel, which is advantageous.

(Seventh Embodiment of the Liquid Crystal Device)

The seventh embodiment of the liquid crystal device according to the present invention will be described with reference to FIG. 15. With the above-described third or fourth embodiments, the first light-shielding films 11*a* are formed parallel to the scanning lines 3*a* or the capacitance lines 3*b*, but with the seventh embodiment, the first light-shielding films 11*a* are formed parallel to data lines 6*a*. As for the other configurations, these are the same as those of the first embodiment, so the components in the Figure which are the same are denoted with the same reference numerals, and description thereof is omitted. Now, FIG. 15 is a plan view of a plurality of pixel groups neighboring on a TFT array substrate upon which are formed data lines, scanning lines, pixel electrodes, light-shielding films, and the like.

Figure 15:
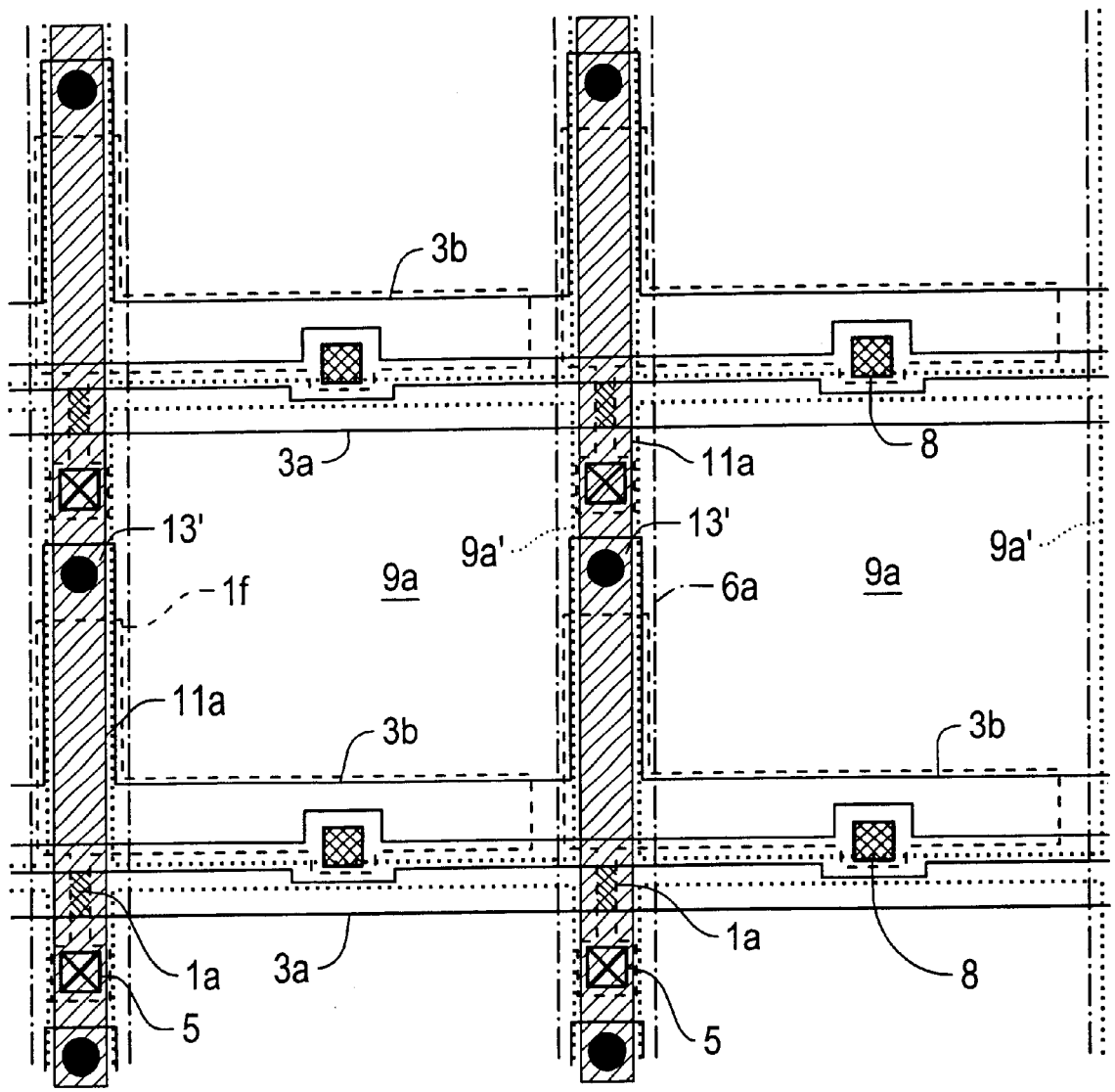
FIG. 15 is a plan view of a plurality of pixel groups neighboring on a TFT array substrate upon which are formed data lines, scanning lines, pixel electrodes, light-shielding films, or the like, according to a seventh embodiment of the liquid crystal device.

As shown in FIG. 15, the first light-shielding films 11*a* are connected via contact holes 13'. According to this configuration, the first light-shielding films 11*a* can be distanced from the contact holes 8 for connecting the pixel electrodes 9*a* and the semiconductor film 1*a*, thus the capacitance line 3*b* and the semiconductor 1*a* can be prevented from short-circuiting due to stress on the metal film forming the first light-shielding film 11*a*, thereby preventing point dropout. Also, it is preferable that the potential of the first light-shielding films 11*a* be fixed by being connected with a constant potential line near the pixel area.

(Eighth Embodiment of the Liquid Crystal Device)

Figure 16:
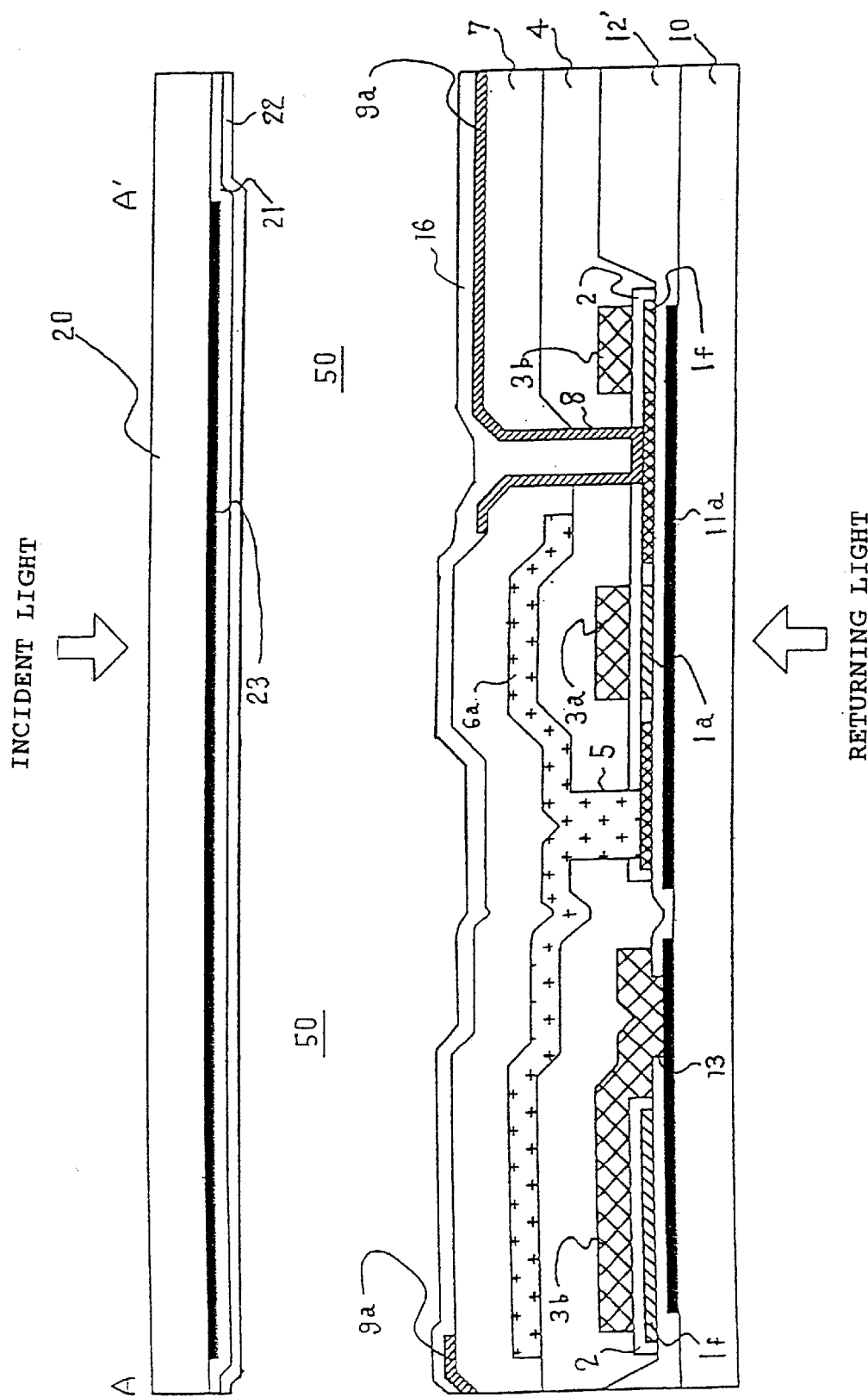
FIG. 16 is a cross-sectional diagram along A–A' in FIG. 2 according to an eighth embodiment of the liquid crystal device.

With the above first embodiment through seventh embodiment, no flattening processing is performed for the offset with regard to other areas of the layered area where the TFTs 30, scanning lines 3*a*, capacitance lines 3*b*, data lines, 6*a*, and the like, are formed, however, with the eighth embodiment, such flattening process is performed by forming a recession in the first inter-layer insulating film 12. As for the other configurations, these are the same as those of the first embodiment through the seventh embodiment, so the components in the Figure which are the same are denoted with the same reference numerals, and description thereof is omitted. Now, FIG. 16 is a cross-sectional diagram along A–A' in FIG. 3. That is, the plan view of the liquid crystal device according to the eighth embodiment is the same as that of the first embodiment through the seventh embodiment.

In FIG. 16, the first inter-layer insulating film 12' is recessed at portions facing the TFTs 30, data lines 6*a*, scanning lines 3*a*, and capacitance lines 3*b*. Accordingly, the side of the third inter-layer insulating film 7 facing the liquid crystal layer 50 is flattened. Thus, according to the fourth embodiment, the side of the third inter-layer insulating film 7 facing the liquid crystal layer 50 is flattened, so disclination (defective alignment) of the liquid crystal owing to the roughness of the third inter-layer insulating film 7 according to the degree of flatness can be reduced. Consequently, according to the eighth embodiment, image display can be made at a higher quality, and the opening area of the pixel portions can be widened.

In order to form such a first inter-layer insulating film 12', the first inter-layer insulating film 12' is formed of a two-layer structure, and thin film formation and etching are performed such that a thin portion formed of only a single layer is used as the recessed portion and a thick portion formed of two layers is used as the bank portions thereof, or uses the first inter layer insulating films 12' as a single layer structure, thereby obtaining a recessed portion by etching. In these cases, using dry etching such as reactive ion etching or reactive ion beam etching is advantageous in that the recessed portion can be formed according to the designed dimensions. On the other hand, in the case that wet etching is at least used alone or is combined with dry etching, the side walls of the recession can be tapered as shown in FIG. 15, so residual poly-silicone film, resist, or the like, formed within the recession in later processes can be reduced, and this is advantageous in that yield does not drop. It also may be flattened in the manner that a groove is formed on the TFT array substrate 10, forming wirings and the TFT 30s in the area of the groove.

Also, with the present embodiment, the first inter-layer insulating film 12' is also thin at portions where the first light-shielding films 11*a* face the first storage capacitor electrodes 1*f* serving as third storage capacitor electrodes, there is the advantage that the storage capacitance 70 increases. Incidentally, the flattening technique in the eighth embodiment as described above can also be applied to any of the first embodiment through the seventh embodiment.

(Ninth Embodiment of the Liquid Crystal Device)

The ninth embodiment of the liquid crystal device according to the present invention will be described with reference to FIG. 17.

With the above eighth embodiment, flattening processing is performed by forming a recession in the first inter-layer insulating film 12, but with the ninth embodiment, this flattening processing is performed by forming a recession in the third inter-layer insulating film. As for the other configurations, these are the same as those of the first embodiment through the eighth embodiment, so the components in the Figure which are the same are denoted with the same reference numerals, and description thereof is omitted. Now, FIG. 17 is a cross-sectional diagram along A–A' in FIG. 2. That is, the plan view of the liquid crystal device according to the ninth embodiment is the same as that of the first embodiment through the eighth embodiment.

Figure 17:
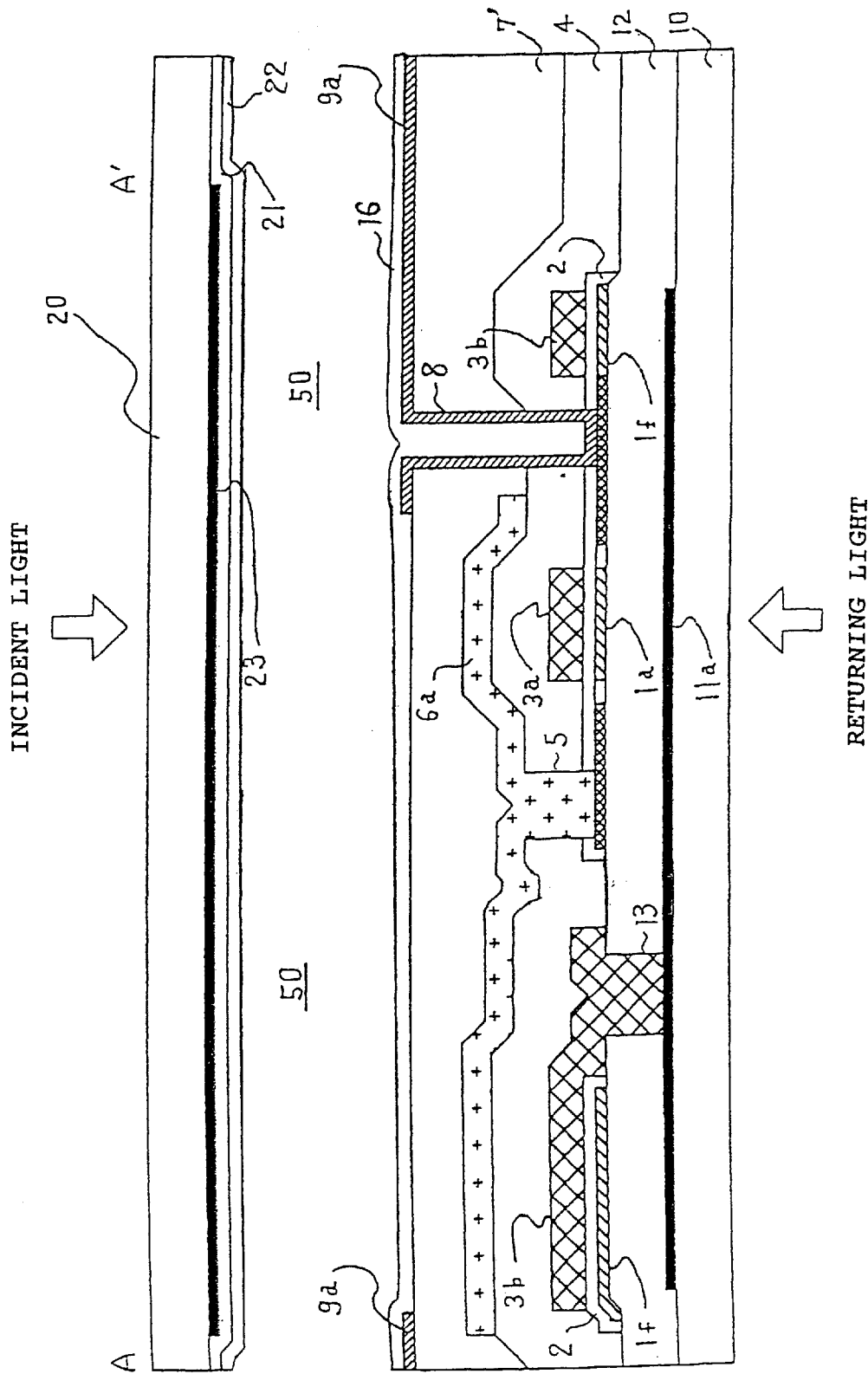
FIG. 17 is a cross-sectional diagram along A–A' in FIG. 2 according to a ninth embodiment of the liquid crystal device.

In FIG. 17, the third inter-layer insulating film 7' is formed so as to be recessed at portions facing the TFTs 30, data lines 6a, scanning lines 3a, and capacitance lines 3b. More specifically, the third inter-layer insulating film 7' is subjected to CMP (Chemical Mechanical Polishing) processing on the upper side thereof. Accordingly, the side of the third inter-layer insulating film 7' facing the liquid crystal layer 50 is flattened. Thus, according to the ninth embodiment, disclination (defective alignment) of the liquid crystal owing to the roughness on the surface of the third inter-layer insulating film 7' according to the degree of flatness can be reduced. Consequently, according to the ninth embodiment, image display can be made at a higher quality, and the opening area of the pixel portions can be widened.

Also, SOG (spin-off glass) may be formed by spin coating or the like, other than such CMP processing, thereby flattening the top of the third inter-layer insulating film 7'.

Further, though each of the above-described eighth and ninth embodiments involved forming recessions in the first and third inter-layer insulating films, but recessions may be formed in the second inter-layer insulating film, and further, these may be combined.

In addition to these, flattening according to the eighth and ninth embodiments may be performed wherein the recessed portion to be formed in the first, second, or third inter-layer insulating film are not formed at the portions facing all of the TFTs 30, data lines 6a, scanning lines 3a, and capacitance lines 3b; rather, the recessed portion is formed at a portion facing the data line 6a where the total film thickness is the thickest in the event that no flattening processing is performed to any of these. Also, the flattening technique according to the above ninth embodiments can be applied to any of the first through seventh embodiments.

(Overall Configuration of the Liquid Crystal Device)

The overall configuration of the liquid crystal device according to the embodiments configured as described above will be described with reference to FIG. 18 and FIG. 19. Now, FIG. 18 is a plan view of the TFT array substrate 10 and the components formed: thereupon viewed together from the side of the opposite substrate 20, and FIG. 19 is a cross-sectional diagram along H–H' in FIG. 18, including the opposite substrate 20.

Figure 18:
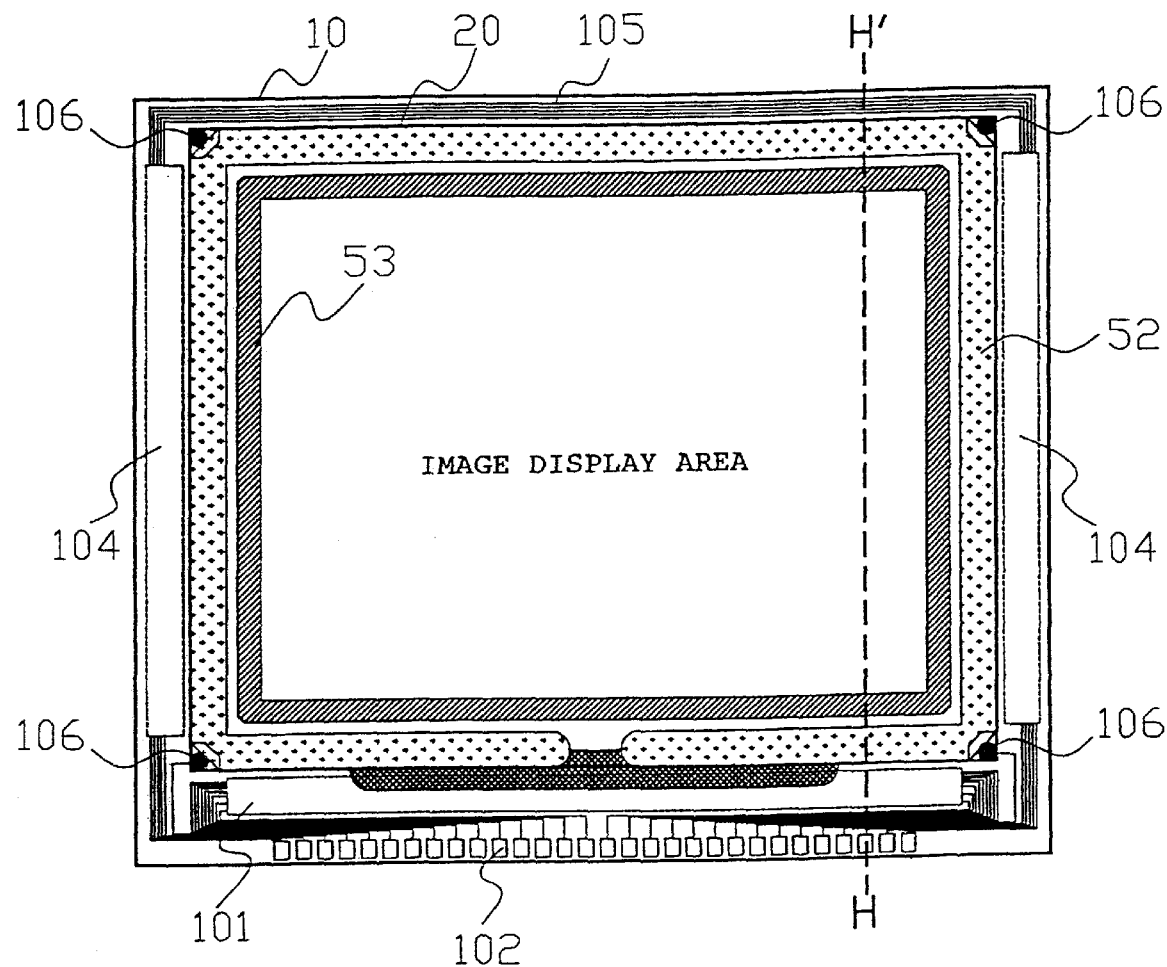
FIG. 18 is a plan view of the TFT array substrate and the components formed thereupon viewed together from the side of the opposing substrate, according to each of the embodiments of the liquid crystal device.
Figure 19:
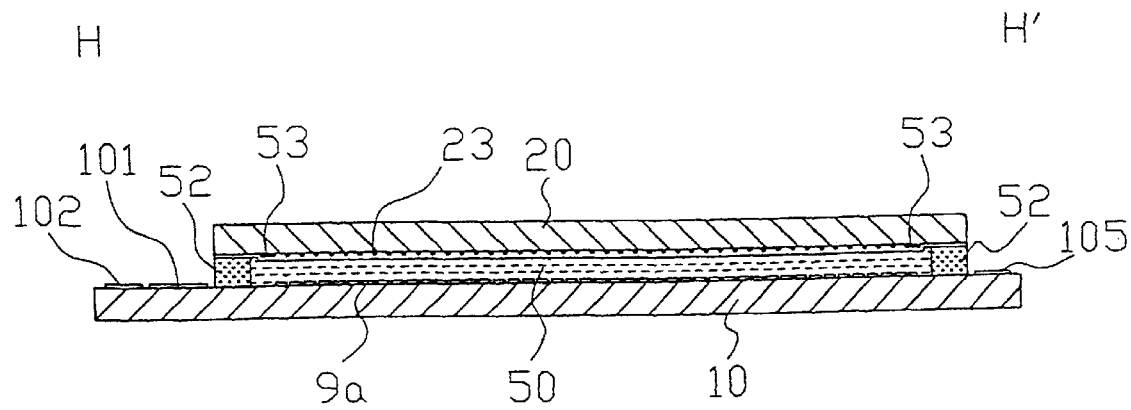
FIG. 19 is a cross-sectional diagram along H–H' in FIG. 18.

In FIG. 18, a sealing material 52 is provided on the TFT array substrate 10 parallel to the edge thereof, and the third light-shielding film 53 is provided as a frame to the area to the inside thereof, formed of a material either the same as or different from the second light-shielding film 23, for example. The data line driving circuit 101 and external circuit connecting terminals 102 are provided to the TFT array substrate 10 along one side thereof at the area outside of the sealing material 52, and the scanning line driving circuits 104 are provided on the two sides neighboring this one side. If there is no problem with delay of scanning signals supplied to the scanning lines 3a, the scanning line driving circuit 104 only needs to be provided to one side. Also, the data line driving circuit 101 may be provided on both sides parallel to the side of the image display area. For example, an arrangement may be made wherein data lines 6a of odd-numbered rows supply image signals from the data line driving circuit positioned parallel to one side of the image display area, and wherein data lines of even-numbered rows supply image signals from the data line driving circuit positioned parallel to the other side of the image display area. The occupied area of the data line driving circuit can be expanded by driving the data lines 6a in a comb-tooth like manner, so complicated circuits can be formed. A plurality of wirings 105 are provided to the remaining side of the TFT array substrate 10 for connecting the scanning line driving circuits 104 provided on both sides of the image display area, and further, a pre-charging circuit 201 (See FIG. 4) may be provided in a manner hidden underneath the third light-shielding film 53 serving as a frame. Also, a conductive material 106 for realizing electrical conductivity between the TFT array substrate 10 and the opposite substrate 20 is provided in at least one position in a corner of the opposite substrate 20. Then, as shown in FIG. 19, the opposite substrate 20 having approximately the same outline as the sealing material 52 shown in FIG. 18 is fixed to the TFT array substrate 10 by means of the sealing material 52.

The TFT array substrate 10 of the liquid crystal device according to the various embodiments described above with reference to FIG. 1 through FIG. 19 maybe further provided with an inspecting circuit or the like for inspecting the quality of or defects in the liquid crystal device during manufacturing or at the time of shipping. Also, instead of providing the data line driving circuit 101 and scanning line driving circuits 104 on the TFT array substrate 10, a driving LSI mounted on a TAB (Tape Automated Bonding) substrate may be electrically and mechanically connected via an anisotropic conductive film provided to the periphery of the TFT array substrate 10. Also, a polarizing film, a phase difference film, polarizing means, or the like, are provided in certain directions to the side of the opposite substrate 20 where incident light is cast and the side of the TFT array substrate 10 where outgoing light is cast out, according to operation modes such as the TN (Twisted Nematic) mode, VA (Vertically Assigned) mode, PDLC (Polymer Dispersed Liquid Crystal) mode, depending on whether the mode is a normally white mode or a normally black mode.

The liquid crystal device described with the above embodiments is applied to a color liquid crystal projector (projection-type display apparatus), thus three liquid crystal devices are used each as light valves for RGB, and each light valve receives light of each color split by dichroic mirrors for splitting RGB colors as the incident light thereof. Accordingly, no color filters are provided on the opposite substrate 20 in the embodiments. However, an RGB color filter and a protective film thereof may together be provided on the opposite substrate 20 at a certain area opposing pixel electrodes 9a for which the second light-shielding film 23 is not formed. Accordingly, the liquid crystal device according to the respective embodiments can be applied to color liquid crystal devices such as direct-viewing type or reflection type color liquid crystal televisions or the like other than a liquid crystal projector. Further, micro lenses may be provided on the opposite substrate 20 so as to match each pixel with a micro lens. Thus, the condensing ratio of the incident light is improved, so a bright liquid crystal device can be realized. Further, depositing multiple interference layers with differing refractive index on the opposite substrate 20 allows the interference of the light to form a dichroic filter which creates RGB colors. According to this opposite substrate with a dichroic filter, an even brighter liquid crystal device can be realized.

Though the above embodiments described the liquid crystal device has receiving incident light from the side of the opposite substrate 20, as with conventional arrangements, but the first light-shielding film 11a has been provided, so an arrangement may be used wherein incident light is cast in from the side of the TFT array substrate 10 and cast out from the side of the opposite substrate 20. That is, even in the event that this liquid crystal device is attached to a liquid crystal projector in such a manner, light can be prevented from entering the channel area 1a' of the semiconductor layer 1a or the low-concentration source area 1b and low-concentration drain area 1c, enabling a high-quality image to be displayed. Now, conventionally, there has been the need to separately provide polarizing means covered with a reflection preventing AR (Anti-reflection) film, or apply an AR film, in order to prevent reflection at the rear side of the TFT array substrate 10. However, in the respective embodiments, the first light-shielding film 11a is provided between the surface of the TFT array substrate 10 and at least the channel area 1a' of the semiconductor layer 1a or the low-concentration source area 1b and the low-concentration drain area 1c, thus there is no need to use such polarizing means covered with an AR film, apply an AR film, or use an AR-processed substrate as the TFT array substrate itself. Thus, according to the respective embodiments, material costs can be reduced, and there is no drop in yield due to debris or scratching at the time of applying the polarizing means, which is greatly advantageous. Also, the light endurance thereof is excellent, so there are no problems of image deterioration such as light-caused cross-talk even in the event that a bright light source is used or polarizing conversion is performed with a polarizing beam splitter to improve effective use of the light.

Also, The switching element provided to each pixel has been described as a forward stagger type or coplanar type poly-silicone TFT, but the embodiments are effective regarding TFTs with other forms as well, such as reverse stagger type TFTs or amorphous poly-silicone TFTs.

(Electronic Equipment)

Figure 21:
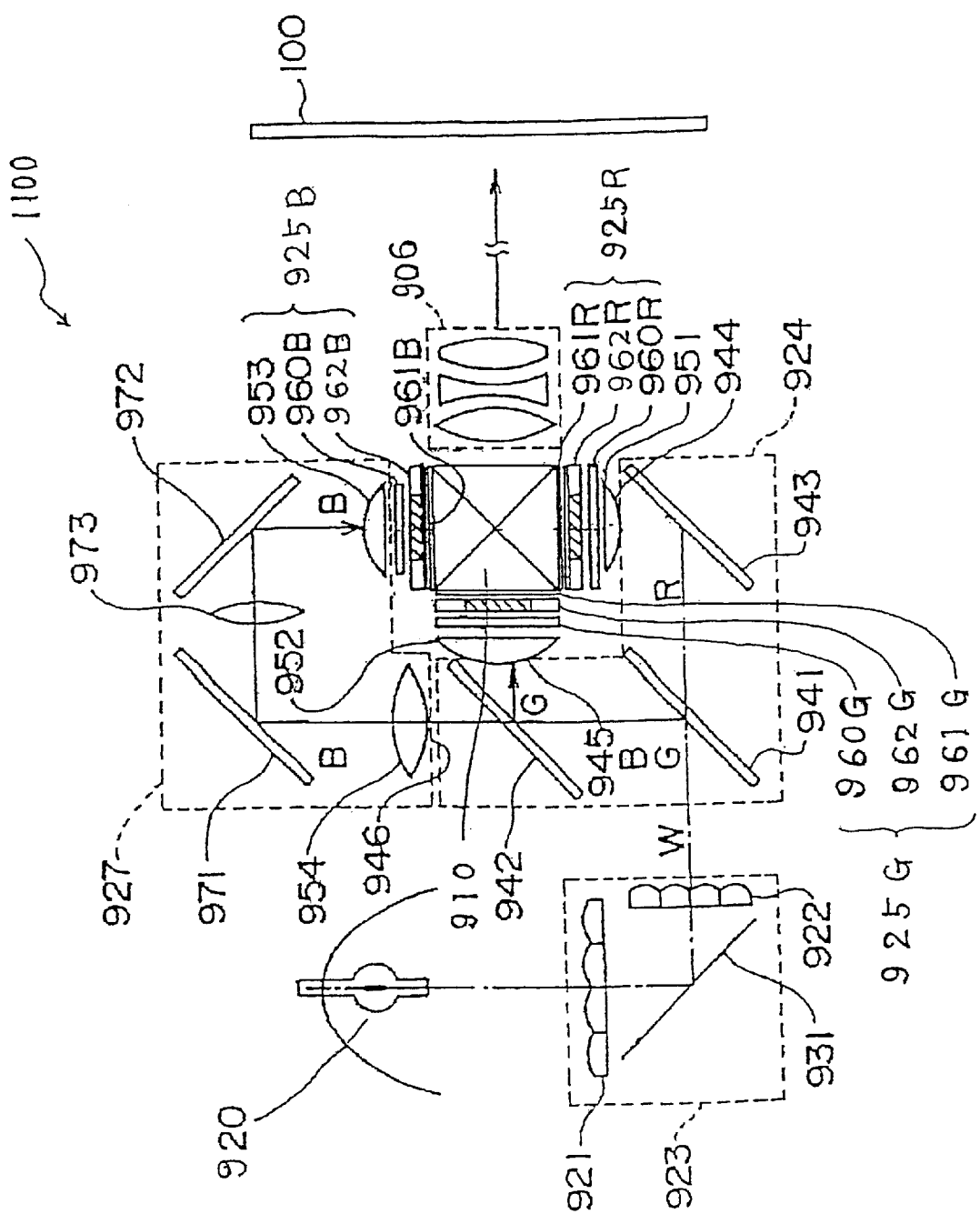
FIG. 21 is a configuration diagram of a projection-type display apparatus which is an example of electronic equipment using the liquid crystal device.

The configuration of a projection-type display apparatus will be described with reference to FIG. 21, as an example of electronic equipment using the above-described liquid crystal device. In FIG. 21, a schematic configuration diagram represents the optical system of the projection-type display apparatus 1100 which uses three of the above-described liquid crystal devices as liquid crystal devices 962R, 962G, and 962B, respectively for RGB. The above-described light source device 920 and uniform illumination optical system 923 are employed in the optical system of the projection-type display apparatus according to the present example. The projection-type display apparatus may consist of: a color splitting optical system 924 serving as means for splitting the light flux W from this uniform illumination optical system 923 into the color light fluxes of red (R), green (G), and blue (B); the three light valves 925R, 925G, and 925B serving as modulating element for modulating the color fluxes R, G, and B, a color synthesizing prism 910 serving as a color synthesizing element for re-synthesizing the color flux following modulation; and a projection lens unit 906 serving as a projection element for enlarging and projecting the synthesized light flux onto a projection surface 100. Also, may be included is a light guide system 927 for guiding the blue color light flux B to the corresponding light valve 925B.

The uniform illumination optical system 923 has two lens plates 921 and 922, and a reflecting mirror 931, with the two lens plates 921 and 922 being positioned orthogonally from the reflecting mirror 931. The two lens plates 921 and 922 of the uniform illumination optical system 923 each have multiple rectangular lenses arrayed in a matrix. The light flux emitted from the light source device 920 is split into a plurality of partial light fluxes by the rectangular lenses on the first lens plate 921. Then, the plurality of partial light fluxes is superimposed by the second lens plate 922 in the vicinity of the three light valves 925R, 925G, and 925B. Accordingly, even in the event that the light source device 920 has a non-uniform illuminance distribution in the cross-section of the emitted light flux, using the uniform illumination optical system 923 allows the three light valves 925R, 925G, and 925B to be illuminated with uniform illumination light.

The color splitting optical system 924 may consist of a blue-green reflecting dichroic mirror 941, a green reflecting dichroic mirror 942, and a reflecting mirror 943. First, at the blue-green reflecting dichroic mirror 941, the blue light flux B and green light flux G included in the light flux W are reflected at a right angle, and approach the green reflecting dichroic mirror 942. The red light flux R passes thorough this mirror 941, is reflected by the reflecting mirror 943 behind, at a right angle, and is cast from the emitting portion 944 of the red light flux R to the side of the color synthesizing prism 910.

Next, at the green reflecting dichroic mirror 942, of the blue light flux B and green light flux G reflected from the blue-green reflecting dichroic mirror 941, the green light flux G alone is reflected at a right angle, and is cast from the emitting portion 945 of the green light flux G to the side of the color synthesizing optical system. The blue light flux B which has passed through the green reflecting dichroic mirror 942 is cast from the emitting portion 946 of the green light flux G to the side of the light guide system 927. In the present example, the distances from the emitting portion for the light flux W of the uniform illumination optical element to the emitting portions 944, 945, and 946 for the various color fluxes at the color splitting optical system 924 are set to be approximately equal.

Condensing lenses 951 and 952 are provided to the emitting sides of the of the emitting portions 944 and 945 for the red and green light fluxes R and G at the color splitting optical system 924. Accordingly, the red and green light fluxes R and G emitted from the respective emitting portions are cast into these condensing lenses 951 and 952, and collimated.

The red and green light fluxes R and G thus collimated are cast into the light valves 925R and 925G and modulated, and image information according to each color light is added. Accordingly, these liquid crystal devices are subjected to switching control by a unshown driving system according to the image information, and thus, color light passing through is modulated. On the other hand, the blue light flux B is guided to the corresponding light valve 925B via the light guide system 927, and here, modulation is performed according to the image information, as above. Incidentally, the three light valves 925R, 925G, and 925B according to the present example are liquid crystal light valves which may consist of incident side polarizing element 960R, 960B, and 960B, emitting side polarizing element 961R, 961B, and 961B, and liquid crystal devices 962R, 962G, and 962B provided therebetween.

The light guide system 927 may consist of a condensing lens 954 provided at the emitting side of the emitting portion 946 of the blue light flux B, an incident side reflecting mirror 971, emitting side reflecting mirror 972, an intermediate lens 973 placed between these reflecting mirrors, and a condensing lens 953 provided before the light valve 925B. The blue light flux B emitted from the condensing lens 946 is guided to the liquid crystal device 962B via the light guide system 927, and modulated. Of the optical path lengths of the color light fluxes, namely, the distances from the emitting portion for the light flux W to the respective liquid crystal devices 962R, 962G, and 962B, the distance for the blue light flux B is the longest, thua the amount of lost light is greatest for the blue light flux. However, loss of luminous quantity can be suppressed by introducing the light guide system 927.

The respective light fluxes R, G, and B which have passed through the respective light valves 925R, 925G, and 925B are cast into the color synthesizing prism 910, and synthesized here. The light synthesized at the color synthesizing prism 910 are enlarged and projected via the projection lens unit 906 onto the projecting surface 100 which is at a certain position.

In the present example, light-shielding layers are provided beneath the TFTs for the liquid crystal devices 962R, 962G, and 962B, thus light-shielding of the channels of the switching TFTs of the pixel electrodes can be sufficiently carried out, even in the event that there is incident light of the following from the side of the TFT array substrate as returning light: reflected light from the projection optical system within the liquid crystal projector based on projected light from the liquid crystal devices 962R, 962G, and 962B; reflected light from the surface of the TFT array substrate at the time of the projected light passing through; and a portion of projected light emitted from another liquid crystal device which then passes through the projection optical system.

Accordingly, there is no need to separately provide a film for preventing returning light or providing polarizing element with returning light preventing processing, between the respective liquid crystal devices 962R, 962G, and 962B, and the prism unit, even in the event that a prism unit suitable for miniaturization is used for the projection optical system, and thus is greatly advantageous in reducing the size and complexity of the configuration.

Also, with the present embodiment, effects to the channel area of the TFTs owing to returning light can be suppressed, so emitting side polarizing element 961R, 961B, and 961B subjected to a returning light prevention do not have to be directly applied to the liquid crystal devices. Accordingly, it is possible to have a configuration such as show in FIG. 18, wherein the polarizing element are formed away from the liquid crystal devices, or more specifically, wherein one set of polarizing element 961R, 961G, and 961B are applied to the color synthesizing prism 910, and the other set of polarizing element 960R, 960G, and 960B are applied to the condensing lenses 953, 945, and 944. In this way, applying the polarizing element to the prism unit or the condensing lenses results in the heat from the polarizing element being absorbed by the prism unit or the condensing lenses, so increase in temperature of the liquid crystal devices can be prevented.

Also, while omitted in the drawings, an air layer is formed between the liquid crystal devices and the polarizing element distancing the liquid crystal devices and the polarizing element, so increase in temperature of the liquid crystal devices can further be prevented by providing a cooling device and forcing air such as cold air between the liquid crystal devices and the polarizing element and malfunction by increase in temperature of the liquid crystal device can be prevented.

[Industrial Applicability]

According to the liquid crystal device of the present invention, a storage capacitor can be provided to each of a plurality of pixel electrodes by means of capacitance lines which have been reduced in resistance by using a plurality of light-shielding films, so even in the event that the driving frequency of the liquid crystal device is raised, sideways cross-talk, ghosting, or the like, due to fluctuation of the potential of the capacitance lines owing to capacitance coupling of the data lines and the capacitance lines, so high-quality image display can be performed. Further, precharging and scanning line inversion driving can be performed suitably. In addition, even in the event that a capacitance line partly breaks due to a foreign object or the like, the wiring of the light-shielding films serves instead of the capacitance lines, so a redundant structure can be realized, and also, a liquid crystal device with little cracking due to wiring owing to the light-shielding film and with high reliability and yield can be realized.

What is claimed is:

1. A liquid crystal device, comprising:
   a pair of substrates including a first substrate and a second substrate;
   a plurality of pixel electrodes arrayed in a matrix on said second substrate;
   a liquid crystal held between said pair of substrates;
   a plurality of thin film transistors, each transistor connected to in correspondence with said pixel electrodes;
   a plurality of data lines and plurality of scanning lines;
   a plurality of capacitance lines arrayed along with said plurality of scanning lines, each capacitance line extending in a direction intersecting with said plurality of data lines and providing a storage capacitor to said plurality of pixel electrodes;
   a plurality of light-shielding films, each light-shielding film extending in a direction intersecting with said plurality of data lines, and being provided at positions covering at least a channel area of said plurality of thin film transistors when viewed from a second substrate side and at least partially facing said plurality of capacitance lines, each light-shielding film being electrically connected to said plurality of capacitance lines for every pixel or plurality of pixels in a direction intersecting to said plurality of data lines; and
   a first inter-layer insulating film provided between said capacitance lines and said plurality of light-shielding films, wherein
   said plurality of capacitance lines and said plurality of light-shielding films are each electrically connected via contact holes opened in said first-interlayer insulating film at positions overlapping said data lines on a plane.

2. The liquid crystal device according to claim 1, each of said plurality of light-shielding films being formed facing said scanning lines only at positions covering said channel area.

3. The liquid crystal device according to claim 1, said capacitance lines and said scanning lines being formed of one conductive thin film; and
   said capacitance lines serving as a first storage capacitor electrode and a second storage capacitor electrode extending from a semiconductor layer comprising one of a source area and a drain area of a thin film transistor side connected to said pixel electrode being provided with said storage capacitor by being opposingly positioned with a dielectric film which is formed of a gate insulating film forming said thin film transistor being introduced therebetween.

4. The liquid crystal device according to claim 3, each of said plurality of light-shielding films being opposingly positioned as a third storage capacitor electrode at an opposite side of said second storage capacitor electrode with said first storage capacitor electrode and said first inter-layer insulating film introduced therebetween.

5. The liquid crystal device according to claim 1, said contact holes having a circular planar form parallel to said second substrate.

6. The liquid crystal device according to claim 1, each of said plurality of light-insulating films having a planar form parallel to said second substrate including a first area formed parallel to said scanning lines and a second area extended from said first area parallel to said data lines, with said contact holes being opened in said second area.

7. The liquid crystal device according to claim 1, said capacitance lines and said plurality of light-shielding films being connected to a constant potential source.

8. The liquid crystal device according to claim 7, said constant potential source being a constant potential source supplied to peripheral circuit for driving said liquid crystal device.

9. The liquid crystal device according to claim 7, further comprising an opposite electrode formed on said first substrate substrate; and said constant potential source being a constant potential source supplied to said opposite electrode.

10. The liquid crystal device according to claim 1, each of said plurality of light-shielding films being electrically connected to said capacitance lines of its own tier.

11. The liquid crystal device according to claim 1, said plurality of light-shielding films including at least one of Ti, Cr, W, Ta, Mo, and Pb.

12. A liquid crystal device, comprising:

a pair of substrates including a first substrate and a second substrate;

a plurality of pixel electrodes arrayed in a matrix on said second substrate;

a liquid crystal held between said pair of substrates;

a plurality of thin film transistors, each transistor connected to said plurality of pixel electrodes;

a plurality of data lines and plurality of scanning lines mutually intersecting;

a plurality of capacitance lines arrayed along with said plurality of scanning lines, each capacitance line extending in a direction intersecting with said plurality of data lines and providing a storage capacitor to said plurality of pixel electrodes;

a plurality of light-shielding films, each light-shielding film extending in a direction intersecting with said plurality of data lines, and provided at positions covering at least a channel area of said-plurality of thin film transistors when viewed from a second substrate side and at least partially facing said plurality of scanning lines, each light-shielding film being electrically connected to said plurality of capacitance lines for every pixel or plurality of pixels in a direction intersecting to said plurality of data lines; and a first inter-layer insulating film provided between said plurality of capacitance lines and said plurality of light-shielding films, wherein said plurality of capacitance lines and said plurality of light-shielding films are each electrically connected via contact holes opened in said first-interlayer insulating film at positions overlapping said plurality of data lines on a plane.

13. A liquid crystal device, comprising:

a pair of substrates including a first substrate and a second substrate;

a plurality of pixel electrodes arrayed in a matrix on said second substrate;

a liquid crystal held between said pair of substrates;

a plurality of thin film transistors, each transistor connected to said plurality of pixel electrodes;

a plurality of data lines and plurality of scanning lines;

a plurality of capacitance lines arrayed along with said plurality of scanning lines, each capacitance line extending in a direction intersecting with said plurality of data lines and providing a storage capacitor to said plurality of pixel electrodes;

a plurality of light-shielding films, each light-shielding film extending in a direction intersecting with said plurality of data lines, and being provided at positions covering at least a channel area of said plurality of thin film transistors when viewed from a second substrate side and at least partially facing said plurality of capacitance lines, wherein the light-shielding films are electrically connected to said capacitance lines of neighboring tiers.

14. A liquid crystal device, comprising:

a pair of substrates including a first substrate and a second substrate;

a plurality of pixel electrodes arrayed in a matrix on said second substrate;

a liquid crystal held between said pair of substrates;

a plurality of thin film transistors, each transistor connected to said plurality of pixel electrodes;

a plurality of data lines and plurality of scanning lines;

a plurality of capacitance lines arrayed along with said plurality of scanning lines, each capacitance line extending in a direction intersecting with said plurality of data lines and providing a storage capacitor to said plurality of pixel electrodes;

a plurality of light-shielding films, each light-shielding film extending in a direction intersecting with said plurality of data lines, and being provided at positions covering at least a channel area of said plurality of thin film transistors when viewed from a second substrate side and at least partially facing said plurality of capacitance lines, each light-shielding film being electrically connected to said plurality of capacitance lines for every pixel or plurality of pixels in a direction intersecting to said plurality of data lines; and a first inter-layer insulating film provided between said plurality of light-shielding films and said thin-film transistors a second inter-layer insulating film provided above said scanning lines and below said data lines, and a third inter-layer insulating film provided above said data lines and below said pixel electrodes, a side of said third inter-layer insulating film which faces said liquid crystal being flattened by at least one of said first inter-layer insulating film, said second inter-layer insulating film, and said third inter-layer insulating film recessed at least portions facing said data lines.

15. A projection-type display apparatus comprising a light source, a liquid crystal light valve that modulates incident light cast from said light source according to image information, and a projecting device that projects the light modulated by said liquid crystal light valve, said liquid crystal light valve having a liquid crystal device in which a liquid crystal is held between a first substrate positioned on a light incident side and a second substrate positioned on a light outgoing side, a first polarizing element positioned at an outward side of said first substrate, and a second polarizing element positioned at an outward side of said second substrate, said projection-type display apparatus further comprising upon said second substrate:

a plurality of pixel electrodes arrayed in a matrix;

a plurality of thin film transistors, each transistor connected to said plurality of pixel electrodes;

a plurality of data lines and plurality of scanning lines mutually intersecting;

a plurality of capacitance lines arrayed along with said plurality of scanning lines, each capacitance line extending in a direction intersecting with said plurality of data lines and providing a storage capacitor to said plurality of pixel electrodes;

a plurality of light-shielding films, each light-shielding film extending in a direction intersecting with said plurality of data lines, and provided at positions covering at least a channel area of said plurality of thin film transistors when viewed from a second substrate side and at least partially facing said plurality of capacitance lines, each light-shielding film being electrically connected to said plurality of capacitance lines for every pixel or plurality of pixels in a direction intersecting with said plurality of data lines; and a first inter-layer insulating film provided between said plurality of capacitance lines and said plurality of light-shielding films, wherein said plurality of capacitance lines and said plurality of light-shielding films are each electrically connected via contact holes opened in said first-interlayer insulating film at positions overlapping said plurality of data lines on a plane.

16. A liquid crystal device, comprising:

a pair of substrates including a first substrate and a second substrate;

a plurality of pixel electrodes arrayed in a matrix on said second substrate; a liquid crystal held between said pair of substrates;

a plurality of thin film transistors, each transistor connected to said plurality of pixel electrodes;

a plurality of data lines and plurality of scanning lines mutually intersecting;

a plurality of storage capacitors connected to said plurality of pixel electrodes;

light-shielding films provided at positions covering at least a channel area of said plurality of thin film transistors when viewed from a second substrate side, each light-shielding film being electrically connected to said plurality of storage capacitors;

a first inter-layer insulating film provided between said light-shielding films and said thin-film transistors;

a second inter-layer insulating film provided above said scanning lines and below said data lines, and a third inter-layer insulating film provided above said data lines and below said pixel electrodes, a third inter-layer insulating film side which faces said liquid crystal being flattened by at least one of said first inter-layer insulating film, said second inter-layer insulating film, and said third inter-layer insulating film recessed at portions facing at least one of said thin film transistors, said data lines, said scanning lines, and said storage capacitors.

17. A liquid crystal device, comprising:

a pair of substrates including a first substrate and a second substrate;

a plurality of pixel electrodes arrayed in a matrix on said second substrate;

a liquid crystal held between said pair of substrates;

a plurality of thin film transistors, each transistor connected to said plurality of pixel electrodes;

a plurality of data lines and plurality of scanning lines mutually intersecting;

a plurality of capacitor lines serving as a first storage capacitor electrode;

a plurality of second storage capacitor electrodes connected to said plurality of pixel electrodes;

light-shielding films provided at positions covering at least a channel area of said plurality of thin film transistors when viewed from a second substrate side, each light-shielding film being electrically connected to said plurality of capacitor lines; and wherein said light-shielding films are provided in an island-like manner at positions so as to overlap at least one of said plurality of scanning lines and said plurality of capacitor lines when viewed from a second substrate side, and each of the plurality of the island-shaped portions arrayed parallel to said scanning lines are electrically connected via said plurality of capacitor lines.

18. The liquid crystal device according to claim 17, said capacitance and said scanning lines being formed of one conductive thin film; and said first storage capacitor electrodes and said second storage capacitor electrodes extending from a semiconductor layer comprising one of a source area and a drain area of a thin film transistor connected to said pixel electrode comprising a storage capacitor by being opposingly positioned with a dielectric film which is formed of a gate insulating film forming said thin film transistor being introduced therebetween.

19. The liquid crystal device according to claim 17, said first inter-layer insulating film being introduced between said capacitance lines and said light-shielding films; and said capacitance lines and said light-shielding films each being connected via contact holes opened in said first inter-layer insulating film.

20. The liquid crystal device according to claim 19, said contact holes being opened for each pixel.

21. The liquid crystal device according to claim 19, said contact holes being opened for each pixel group formed of a plurality of pixels.

22. The liquid crystal device according to claim 19, said contact holes being opened below said data lines when viewed from a first substrate side.

23. The liquid crystal device according to claim 17, said capacitance lines and said light-shielding films being connected to a constant potential source.

24. The liquid crystal device according to claim 23, said constant potential source being a constant potential source supplied to a peripheral circuit for driving said liquid crystal device.

25. The liquid crystal device according to claims 23, further comprising an opposite electrode formed on the second substrate, said constant potential source being a constant potential source supplied to said opposite electrode.

26. The liquid crystal device according to claim 19, said capacitance lines including wiring portions, each wiring portion being formed parallel to said plurality of scanning lines; and said light-shielding films being formed parallel to said scanning lines so as to each appear overlapped when a capacitance line portion is viewed from a second substrate side.

27. The liquid crystal device according to claim 17, said light-shielding films being provided in a screen-like manner at positions so as to each appear overlapped with at least one of said plurality of scanning lines and said plurality of capacitance lines, and said plurality of data lines when viewed from a second substrate side.

28. The liquid crystal device according to claim 17, said light-shielding films being provided in strips at positions so as to appear overlapped with at least one of said plurality of scanning lines and said plurality of capacitance lines when viewed from a second substrate side.

29. The liquid crystal device according to claim 17, said light-shielding films including at least one of Ti, Cr, W, Ta, Mo, and Pb.

30. An electronic equipment, comprising the liquid crystal device according to claim 17.

* * * * *